US012792230B2

(12) United States Patent
Yun et al.

(10) Patent No.: US 12,792,230 B2
(45) Date of Patent: Nov. 10, 2026

(54) MEMORY DEVICE, MEMORY CONTROLLER, AND OPERATING METHOD OF MEMORY SYSTEM INCLUDING THE MEMORY DEVICE AND THE MEMORY CONTROLLER

(71) Applicant: SAMSUNG ELECTRONICS CO., LTD., Suwon-si (KR)

(72) Inventors: Sewon Yun, Suwon-si (KR); Kyungduk Lee, Suwon-si (KR); Suchang Jeon, Suwon-si (KR)

(73) Assignee: SAMSUNG ELECTRONICS CO., LTD.

( * ) Notice: Subject to any disclaimer, the term of this patent is extended or adjusted under 35 U.S.C. 154(b) by 0 days.

(21) Appl. No.: 19/012,462

(22) Filed: Jan. 7, 2025

(65) Prior Publication Data

US 2025/0390229 A1 Dec. 25, 2025

(30) Foreign Application Priority Data

Jun. 25, 2024 (KR) ........................ 10-2024-0083037

(51) Int. Cl.
*G06F 3/06* (2006.01)

(52) U.S. Cl.
CPC .......... *G06F 3/0619* (2013.01); *G06F 3/0653* (2013.01); *G06F 3/0659* (2013.01); *G06F 3/0679* (2013.01)

(58) Field of Classification Search
CPC .... G06F 3/0619; G06F 3/0653; G06F 3/0659; G06F 3/0679
See application file for complete search history.

(56) References Cited

U.S. PATENT DOCUMENTS

| | | | | |
|---|---|---|---|---|
| 6,097,218 | A * | 8/2000 | Callicott | H03K 19/00346 710/36 |
| 7,882,375 | B2 | 2/2011 | Yoon | |
| 8,183,898 | B2 | 5/2012 | Shin et al. | |
| 8,897,085 | B2 | 11/2014 | Li | |
| 9,218,851 | B2 | 12/2015 | Shlick et al. | |
| 10,134,477 | B2 | 11/2018 | Park et al. | |
| 10,811,107 | B2 | 10/2020 | Na et al. | |
| 10,860,248 | B2 | 12/2020 | Chun | |
| 11,437,093 | B2 | 9/2022 | Moschiano et al. | |

(Continued)

FOREIGN PATENT DOCUMENTS

| | | |
|---|---|---|
| KR | 10-2544144 B1 | 6/2023 |
| KR | 10-2555006 B1 | 7/2023 |

*Primary Examiner* — Nicholas J Simonetti

(74) *Attorney, Agent, or Firm* — FISH & RICHARDSON P.C.

(57) ABSTRACT

A memory device includes a memory cell array including a plurality of memory cells, and with respect to the memory cell array, a control logic configured to control a memory operation corresponding to a command and an address provided from a memory controller outside the memory device, wherein the control logic is configured to, during a direct memory access (DMA) operation of transmitting operation data corresponding to the command and the address, generate noise detection data by detecting whether noise occurred in power provided to the memory device, and transfer the noise detection data to the memory controller.

20 Claims, 18 Drawing Sheets

(56) References Cited

U.S. PATENT DOCUMENTS

| | | | | |
|---|---|---|---|---|
| 2004/0066208 | A1* | 4/2004 | Liu | G01R 29/26<br>324/750.3 |
| 2004/0169738 | A1* | 9/2004 | Fujimoto | H04N 25/745<br>348/E5.079 |
| 2012/0079338 | A1* | 3/2012 | Fujimoto | H04L 1/188<br>714/E11.03 |
| 2017/0110165 | A1* | 4/2017 | Kim | G11C 7/1072 |
| 2018/0122485 | A1* | 5/2018 | Park | G11C 16/24 |
| 2022/0222138 | A1* | 7/2022 | Park | G11C 29/021 |
| 2022/0276802 | A1* | 9/2022 | Seo | G11C 29/028 |

* cited by examiner

MEMORY DEVICE, MEMORY CONTROLLER, AND OPERATING METHOD OF MEMORY SYSTEM INCLUDING THE MEMORY DEVICE AND THE MEMORY CONTROLLER

CROSS-REFERENCE TO RELATED APPLICATION

This application is based on and claims priority under 35 U.S.C. § 119 to Korean Patent Application No. 10-2024-0083037, filed on Jun. 25, 2024, in the Korean Intellectual Property Office, the disclosure of which is incorporated by reference herein in its entirety.

BACKGROUND

With the recent multi-functionalization of information communication devices, large capacity and high integration of memory systems are required. According to a separate command address (SCA) protocol, recently developed memory systems may be configured to transmit commands and addresses through a command address (CA) bus and transmit data through a DQ bus. By configuring buses separately as described above, I/O efficiency of memory systems may be improved. While data is transmitted to one memory chip through the DQ bus, I/O efficiency of memory systems may be improved by transmitting commands and addresses to another memory chip through the CA bus.

During data transmission, errors may occur in memory devices due to various causes. For example, an error may occur due to power noise during data transmission. Therefore, technology for detecting power noise during data transmission is required.

SUMMARY

This disclosure relates to a memory device and a memory controller, and more particularly, to a memory device that reduces overhead during noise detection by detecting noise generated in power during a direct memory access (DMA) operation, a memory controller, and an operating method of a memory system.

Implementations provide a memory device to improve the reliability of a memory system by detecting whether noise occurred in power provided to the memory device during a direct memory access (DMA) operation, providing memory detection data to a memory controller, and allowing the memory controller to re-perform the DMA operation, the memory controller, and an operating method of a memory system.

According to some implementations, there is provided a memory device including a memory cell array including a plurality of memory cells, and with respect to the memory cell array, a control logic configured to control a memory operation corresponding to a command and an address provided from a memory controller outside the memory device, wherein the control logic is configured to, during a direct memory access (DMA) operation of transmitting operation data corresponding to the command and the address, generate noise detection data by detecting whether noise occurred in power provided to the memory device, and transfer the noise detection data to the memory controller.

According to some implementations, there is provided a memory controller controlling a memory device, the memory controller including a memory interface configured to transfer a command and an address through a first bus to control a memory operation on the memory device, and transmit and receive operation data corresponding to the command and the address to and from the memory device through a second bus, and an operation processor configured to receive noise detection data indicating whether noise occurred in power provided to the memory device through the first bus during a DMA operation and perform the DMA operation again when the noise is detected in the power during the DMA operation based on the noise detection data.

According to some implementations, there is provided an operating method of a memory system including a memory controller and a memory device, the operating method including transmitting, by the memory controller, a command and an address through a first bus to control a memory operation on the memory device, performing, by the memory controller, a DMA operation of transmitting and receiving operation data corresponding to the command and the address through a second bus, generating, by the memory device, noise detection data by detecting whether noise occurred in power provided to the memory device during the DMA operation, transmitting, by the memory device, the noise detection data to the memory controller through the first bus, and determining, by the memory controller, whether noise is detected based on the noise detection data, and performing the DMA operation again when the noise is detected in the power.

BRIEF DESCRIPTION OF THE DRAWINGS

Implementations will be more clearly understood from the following detailed description taken in conjunction with the accompanying drawings in which.

DETAILED DESCRIPTION

Figure 1:
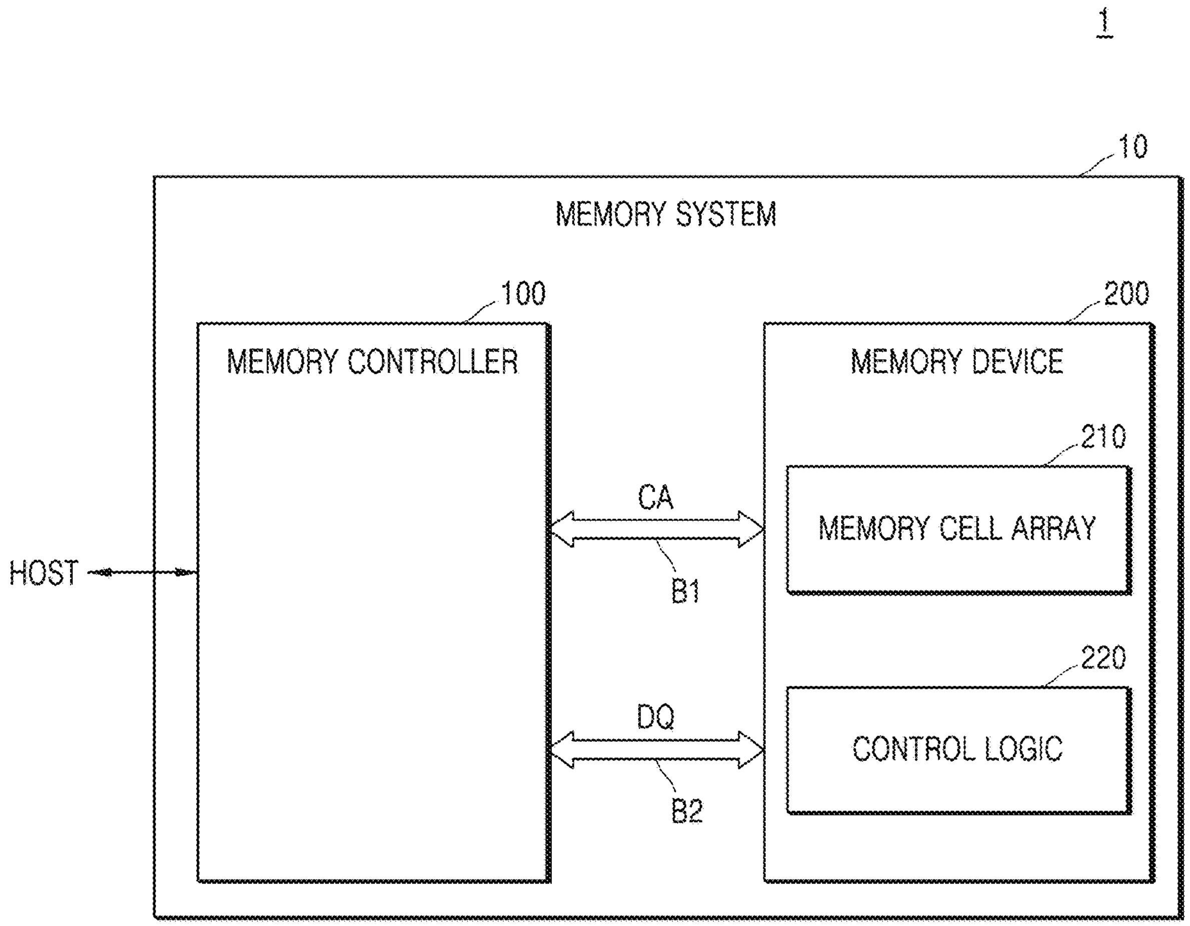
FIG. 1 is a block diagram illustrating a host-memory system according to some implementations.

Hereinafter, implementations will be described in detail with reference to the accompanying drawings. In the drawings, the same elements are denoted by the same reference numerals, and redundant descriptions thereof will be omitted.

FIG. 1 is a block diagram illustrating a host-memory system 1 according to some implementations.

Referring to FIG. 1, the host-memory system 1 may include a host and a memory system 10. The memory system 10 may include a memory controller 100 and a memory device 200, and the memory device 200 may include a memory cell array 210 and a control logic 220.

The host may communicate with the memory system 10 through an interface. Here, the interface may be implemented as, for example, non-volatile memory express (NVMe), NVMe management interface (MI), or NVMe over fabric (NVMeof). The host may control the overall operation of the memory system 10. For example, the host may store data in the memory system 10 or read data stored in the memory system 10.

The host may provide a write request to the memory system 10 requesting that data be stored in the memory system 10. In addition, the host may provide a logical address and data for identifying the data to the memory system 10. The host may provide a read request to the memory system 10 requesting that data stored in the memory system 10 be provided. In addition, the host may provide a logical address for identifying data to the memory system 10.

The memory system 10 may include the memory controller 100 and the memory device 200. For example, the memory controller 100 and the memory device 200 may be integrated into one semiconductor device. For example, the memory system 10 may be implemented as an internal memory embedded in an electronic device, and may be a universal flash storage (UFS) memory device, an embedded multi-media card (eMMC), or a solid state drive (SSD). In some implementations, the memory system 10 may be implemented as an external memory detachable from the electronic device, and may be, for example, a UFS memory card, compact flash (CF), secure digital (SD), micro secure digital (Micro-SD), mini secure digital (mini-SD), extreme digital (xD), or a memory stick.

The memory controller 100 may control the memory device 200 to read data stored in the memory device 200 or to write (or program) data to the memory device 200 in response to a request (e.g., the read request or the write request) provided from the host.

The memory controller 100 may control a write operation (or a program operation), a read operation, and an erase operation with respect to the memory device 200 by providing a command and an address to the memory device 200 as a command-address signal CA. In addition, data to be written and read data may be transmitted and received between the memory controller 100 and the memory device 200 as a data signal DQ.

The memory controller 100 may communicate with the host and the memory device 200. The memory controller 100 may communicate with the host through various standard interfaces. For example, the memory controller 100 may include a host interface, and the host interface may provide various standard interfaces between the host and the memory controller 100. The standard interface may include a variety of interface methods such as advanced technology attachment (ATA), serial ATA (SATA), external SATA (e-SATA), small computer small interface (SCSI), serial attached SCSI (SAS), peripheral component interconnection (PCI), PCI express (PCI-E), IEEE 1394, universal serial bus (USB), an SD card, an MMC, an eMMC, UFS, or a CF card interface.

The memory controller 100 may include a memory interface, and the memory interface may transmit the command-address signal CA to the memory device 200. The memory interface may transmit the data signal DQ to be recorded to the memory device 200 or receive the data signal DQ read from the memory device 200. Such a memory interface may be implemented to comply with a standard protocol such as toggle or an open NAND flash interface (ONFI).

The memory controller 100 may transmit the command and the address to the memory device 200 through buses B1 and B2. For example, the memory controller 100 may provide the command-address signal CA to the memory device 200 through the first bus B1. The first bus B1 may be referred to as a command-address bus, and the second bus B2 may be referred to as a data bus. The command-address signal CA may refer to a data related command-address. The data related command-address may mean a signal accompanied by an input/output operation of operation data through the data bus while the memory device 200 performs an operation indicated by the command-address. Examples of the data-related command-address may include a read command and a write command. In some implementations, examples of the data related command-address may include an erase command, and other commands related to a data bus DQ_BUS initiated by a separate command address (SCA) protocol.

The command-address signal CA may include command-address information required for the memory controller 100 to instruct the memory device 200 to operate. The command-address information may include command information and address information.

The memory controller 100 may transmit and receive operation data to and from the memory device 200 through the buses B1 and B2. The operation data may refer to data to be written in the memory device 200 and data read from the memory device 200. The memory system 10 may perform a direct memory access (DMA) operation. With respect to the memory controller 100, the memory controller 100 may perform the DMA operation of transmitting the operation data to the memory device 200 or receiving the operation data from the memory device 200. With respect to the memory device 200, the memory device 200 may perform the DMA operation of receiving the operation data from the memory controller 100 or transmitting the operation data to the memory controller 100.

For example, the memory controller 100 may perform the DMA operation through the second bus B2. The memory controller 100 may transmit and receive the data signal DQ to and from the memory device 200 through the second bus B2. The memory controller 100 may transmit and receive the operation data as the data signal DQ. For example, the memory controller 100 may transmit the data signal DQ to the memory device 200 through the second bus B2 during the write operation. The memory controller 100 may receive the data signal DQ from the memory device 200 through the second bus B2 during the read operation. The data signal DQ may include the operation data.

The memory controller 100 may control the overall operation of the memory device 200. The memory controller 100 may control a memory operation on the memory device 200. The memory operation on the memory device 200 may include the write operation, the read operation, and the erase operation. The memory controller 100 may transmit the command-address signal CA and the data signal DQ to perform the memory operation on the memory device 200.

The memory device 200 may include an NVM device such as a flash memory. The flash memory may include a 2D NAND memory array or a 3D (or vertical) NAND (VNAND) memory array. In some implementations, the 3D memory array may include vertical NAND strings arranged in a vertical direction such that at least one memory cell is located above another memory cell. The at least one memory cell may include a charge trap layer.

However, the memory device 200 may include various other types of memories. For example, the memory device 200 may include an NVM, and the NVM may include any of various types memories such as a magnetic RAM (MRAM), a spin-transfer torque MRAM, a conductive bridging RAM (CBRAM), a ferroelectric RAM (FeRAM), a phase RAM (PRAM), a resistive RAM, a nanotube RAM, a polymer RAM (PoRAM), a nano floating gate memory (NFGM), a holographic memory, a molecular electronics memory, or an insulator resistance change memory.

The memory device 200 may include the memory cell array 210 and the control logic 220. In some implementations, the memory device 200 may be referred to as a chip, a NAND chip, a semiconductor chip, or a memory chip. The memory cell array 210 may include a plurality of memory blocks. Each memory block may include a plurality of memory cells disposed in regions where a plurality of word lines and a plurality of bit lines intersect. In the memory cell array 210, an erase operation of data may be performed in units of cell blocks, and write and read operations of data may be performed in units of pages.

The control logic 220 may control the overall operation of the memory device 200. The control logic 220 may control the memory device 200 to perform an operation based on at least one of a command, an address, or operation data. The control logic 220 may receive the command-address signal CA from the memory controller 100 through the first bus B1. The control logic 220 may control the memory operation of the memory device 200 based on the command-address signal CA provided from the first bus B1.

The control logic 220 may transmit and receive operation data to and from the memory controller 100. The control logic 220 may transmit and receive operation data corresponding to the command-address signal CA through the second bus B2. For example, the control logic 220 may receive the command-address signal CA of the write operation through the first bus B1 and the data signal DQ including write operation data corresponding to the write operation from the memory controller 100 through the second bus B2. The control logic 220 may receive the command-address signal CA of the read operation through the first bus B1, and transmit the data signal DQ including read operation data corresponding to the read operation to the memory controller 100 through the second bus B2.

Power may be provided for the operation of the memory device 200. Noise may occur in the power provided to the memory device 200. Power noise may occur by an internal or external cause of the memory system 10. For example, fluctuations of power may include noise with respect to a power voltage, a ground voltage, and an external voltage. Power noise may mean noise generated by the power provided to the memory device 200. When noise occurs in the power, an error may occur in the operation of the memory system 10. For example, when noise occurs in the power, an error may occur in operation data transmitted to the memory device 200 or operation data transmitted from the memory device 200 through the DMA operation. Therefore, in a DMA operation period, it is necessary to detect power noise and correct errors caused by power noise.

In some implementations, the memory device 200 may generate noise detection data by detecting noise generated in the power provided to the memory device 200 during the DMA operation. The control logic 220 may detect power noise during the DMA operation of transmitting or receiving operation data to or from the memory device 200 as the data signal DQ. The memory device 200 may detect power noise within the DMA operation period (e.g., a DMA operation period tDMA of FIG. 5).

The memory device 200 may detect power noise in a first DMA operation period and detect power noise in a second DMA operation period. Upon receiving the command-address signal CA of the write operation, the control logic 220 may detect power noise in the first DMA operation period. Upon receiving the command-address signal CA of the read operation, the control logic 220 may detect power noise in the second DMA operation period.

The DMA operation may include the first DMA operation and the second DMA operation. The first DMA operation may mean a DMA operation corresponding to a write operation. The first DMA operation may mean an operation in which the memory controller 100 provides write operation data to the memory device 200 in response to the write command or an operation in which the memory device 200 receives write operation data from the memory controller 100 in response to the write command with respect to the memory device 200. For example, the first DMA operation may be an operation of providing write data stored in a buffer memory of the memory system 10 to a page buffer circuit of the memory device 200.

The second DMA operation may mean a DMA operation corresponding to a read operation. The second DMA operation may mean an operation in which the memory device 200 provides read operation data to the memory controller 100 in response to the read command or with respect to the memory controller 100, an operation in which the memory controller 100 receives read operation data from the memory device 200 in response to the read command. For example, the second DMA operation may be an operation in which sensed read operation data is provided from the page buffer circuit of the memory device 200 to the buffer memory of the memory system 10.

The control logic 220 may obtain a reference value corresponding to the DMA operation based on DMA information indicating information about the DMA operation. The DMA information may include information indicating whether the DMA operation is the first DMA operation or the second DMA operation, a command, information indicating the DMA operation period, etc. The reference value may be a value preset or stored in the memory device 200. For example, the reference value may be a value for comparison with a power voltage to detect power noise. For example, the reference value may be a voltage value.

In some implementations, the reference value may be stored in a one time programmable (OTP) memory device of the memory device 200, and the control logic 220 may obtain the reference value based on the DMA information. The OTP memory device may refer to a memory device in which writing is possible with one program operation and multiple read operations are permitted. The OTP memory device may store the reference value. The OTP memory device may include an electrically erasable programmable read only memory (EPROM), a flash memory, an eFuse, an anti-fuse, etc. However, the implementations are not necessarily limited thereto.

The control logic 220 may compare a power value with the reference value to generate noise detection data. For example, the control logic 220 may generate noise detection data by comparing a voltage that is the power value with a voltage that is the reference value. In some implementations, the reference value may vary depending on the DMA operation. The first DMA operation may correspond to a first reference value, and the second DMA operation may correspond to a second reference value.

The control logic 220 may generate noise detection data of the first DMA operation by comparing the first reference value with the power value. The control logic 220 may detect power noise of the first DMA operation by receiving the command-address signal CA corresponding to the write operation and comparing the first reference value within a first DMA operation period corresponding to the write operation with the power value. The control logic 220 may generate noise detection data of the second DMA operation by comparing the second reference value with the power value. The control logic 220 may detect power noise of the second DMA operation by receiving the command-address signal CA corresponding to the read operation, and comparing the second reference value within a second DMA operation period corresponding to the read operation and the power value.

The control logic 220 may transmit the noise detection data to the outside of the memory device 200. The control logic 220 may transmit the noise detection data to the memory controller 100. The control logic 220 may transmit the noise detection data to the memory controller 100 based on a command transmitted from the memory controller 100.

In some implementations, the control logic 220 may transmit the noise detection data in response to a get feature command. The memory controller 100 may transmit the get feature command to the memory device 200 to determine whether power noise is detected during the DMA operation. The memory controller 100 may transmit the get feature command within the DMA operation period. The memory device 200 may receive the get feature command within the DMA operation period.

In some implementations, the memory controller 100 may transmit the get feature command to the memory device 200 through the first bus B1. The memory controller 100 may transmit the get feature command to the memory device 200 through the first bus B1 even during the DMA operation of transmitting or receiving the operation data to or from the memory device 200 through the second bus B2. The command-address signal CA and the data signal DQ are separated and transmitted through different buses, and thus, the memory controller 100 may transmit the get feature command even during the DMA operation. In addition, the memory device 200 may transmit noise detection data indicating detection of power noise during the DMA operation.

In some implementations, the memory device 200 may transmit the noise detection data to the memory controller 100 through the first bus B1. The memory device 200 may transmit the noise detection data through the first bus B1 that is the same as a bus receiving the get feature command. The memory controller 100 may receive the noise detection data through the first bus B1.

When power noise is detected, an error may occur in the operation data. For example, when power noise is detected during the first DMA operation, the write operation data transmitted by the memory controller 100 to the memory device 200 may be different from write operation data actually received by the memory device 200. In addition, when power noise is detected during the second DMA operation, the read operation data transmitted by the memory device 200 to the memory controller 100 may be different from write operation data actually received by the memory controller 100. Therefore, there is a need to recover errors caused by power noise.

The memory controller 100 may determine whether noise is detected during the DMA operation based on the noise detection data. The memory controller 100 may determine whether to re-perform the DMA operation based on whether noise is detected. When power noise is detected during the DMA operation, the memory controller 100 may perform the DMA operation again. When power noise is not detected during the DMA operation, the memory controller 100 may not perform the DMA operation again.

The memory controller 100 may determine whether power noise is detected during the first DMA operation based on the noise detection data of the first DMA operation. When it is determined that power noise is detected during the first DMA operation, the memory controller 100 may perform the first DMA operation again. The memory controller 100 may transmit the operation data to the memory device 200 again through the second bus B2.

The memory controller 100 may determine whether power noise is detected during the second DMA operation based on the noise detection data of the second DMA operation. When it is determined that power noise is detected during the second DMA operation, the memory controller 100 may perform the second DMA operation again. The memory device 200 may transmit the sensed data again through the second bus B2. The memory controller 100 may receive the operation data from the memory device 200 again through the second bus B2.

The memory device 200 according to some implementations may determine whether noise has occurred in power during the DMA operation, and transmitting the noise detection data indicating the noise to the memory controller 100 in response to the get feature command, thereby detecting noise in real time, and reducing overhead at the time of noise detection. In addition, even when power noise is detected during the DMA operation, the memory controller 100 according to some implementations re-performs only the DMA operation instead of the entire memory operation, thereby recovering errors caused by power noise at a further improved speed and improving data reliability.

Figure 2:
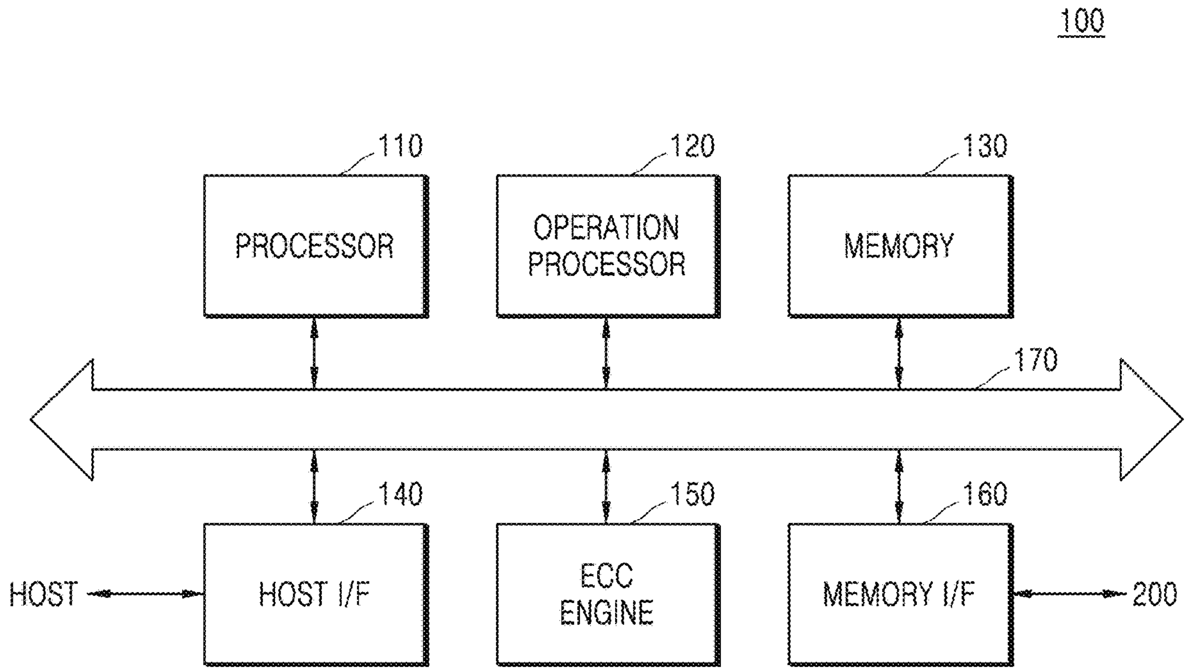
FIG. 2 is a block diagram illustrating a memory controller according to some implementations.

FIG. 2 is a block diagram illustrating the memory controller 100 according to some implementations. The memory controller 100 of FIG. 2 corresponds to the memory controller 100 of FIG. 1, and thus, redundant descriptions thereof are omitted.

Referring to FIG. 2, the memory controller 100 may include a processor 110, an operation processor 120, a memory 130, a host interface 140, an error correction code (ECC) engine 150, and a memory interface 160. The memory controller 100 may further include other components as necessary. For example, the components of the memory controller 100 may communicate with each other through a bus 170.

The processor 110 may include a central processing unit (CPU), a microprocessor, etc., and may control the overall operation of the memory controller 100. In some implementations, the processor 110 may be implemented as a multi-core processor, for example, as a dual-core processor or a quad-core processor. For example, the processor 110 may execute a command code of firmware stored in the memory 130.

The operation processor 120 may transmit a get feature command. The operation processor 120 may transmit a get feature command through the first bus B1. Specifically, the operation processor 120 may transmit the get feature command through the memory interface 160. The operation processor 120 may transmit the get feature command within a DMA operation period.

The operation processor 120 may receive noise detection data in response to the get feature command. The operation processor 120 may receive the noise detection data through the memory interface 160.

The operation processor 120 may determine whether noise is detected during the DMA operation based on the noise detection data. The operation processor 120 may determine whether to re-perform the DMA operation based on whether noise is detected. When power noise is detected during the DMA operation, the operation processor 120 may perform the DMA operation again. When power noise is not detected during the DMA operation, the operation processor 120 may not perform the DMA operation again. For example, when it is determined that power noise is detected during a first DMA operation, the operation processor 120 may perform the first DMA operation again. When it is determined that power noise is detected during a second DMA operation, the operation processor 120 may perform the second DMA operation again.

According to some implementations, the operation processor 120 may be implemented with software, firmware and/or hardware. In some implementations, the operation processor 120 may be implemented as software, and the memory controller 100 may further include a working memory in which the operation processor 120 is loaded, and control an operation of transmitting the get feature command to the memory device 200 by the processor 110 executing the operation processor 120 and re-performing the DMA operation according to whether power noise is detected. For example, the working memory may be implemented as a volatile memory such as a static random access memory (SRAM), a dynamic random access memory (DRAM), etc., or a nonvolatile memory such as a flash memory, a phase-change random access memory (PRAM), etc.

The memory 130 may be used as an operation memory, a buffer memory, a cache memory, etc., and for example, the memory 130 may be implemented as a DRAM, an SRAM, a PRAM, or a flash memory. When the memory 130 is used as a buffer memory, the memory 130 may temporarily store operation data to be written in the memory device 200 or operation data to be read from the memory device 200. The memory 130 may be a component provided in the memory controller 100, but may also be disposed outside the memory controller 100. For example, the memory controller 100 may further include a buffer memory manager or a buffer memory interface for communicating with the memory 130.

The host interface 140 may transmit and receive packets to and from a host. The packet transmitted from the host to the host interface 140 may include a command or data to be recorded in the memory device 200, and the packet transmitted from the host interface 140 to the host may include a response to the command or data read from the memory device 200.

The ECC engine 150 may perform an error detection and correction function on read data of the memory device 200. More specifically, the ECC engine 150 may generate parity bits with respect to write operation data to be provided to the memory device 200, and the generated parity bits may be stored in the memory device 200 together with the write operation data. Upon reading data from the memory device 200, the ECC engine 150 may correct an error in the read data by using the parity bits read from the memory device 200 together with the read data, and output the read data with the error corrected.

The memory interface 160 may provide an interface between the memory controller 100 and the memory device 200. For example, data, commands, and addresses may be transmitted and received between the memory controller 100 and the memory device 200 through the memory interface 160.

The bus 170 may operate based on one of various bus protocols. The various bus protocols may include at least one of an advanced microcontroller bus architecture (AMBA) protocol, a USB protocol, an MMC protocol, a PCI-E protocol, an ATA protocol, a serial-ATA protocol, a parallel-ATA protocol, an SCSI protocol, an enhanced small disk interface (ESDI) protocol, an integrated drive electronics (IDE) protocol, a mobile industry processor interface (MIPI) protocol, a UFS protocol, etc.

Figure 3:
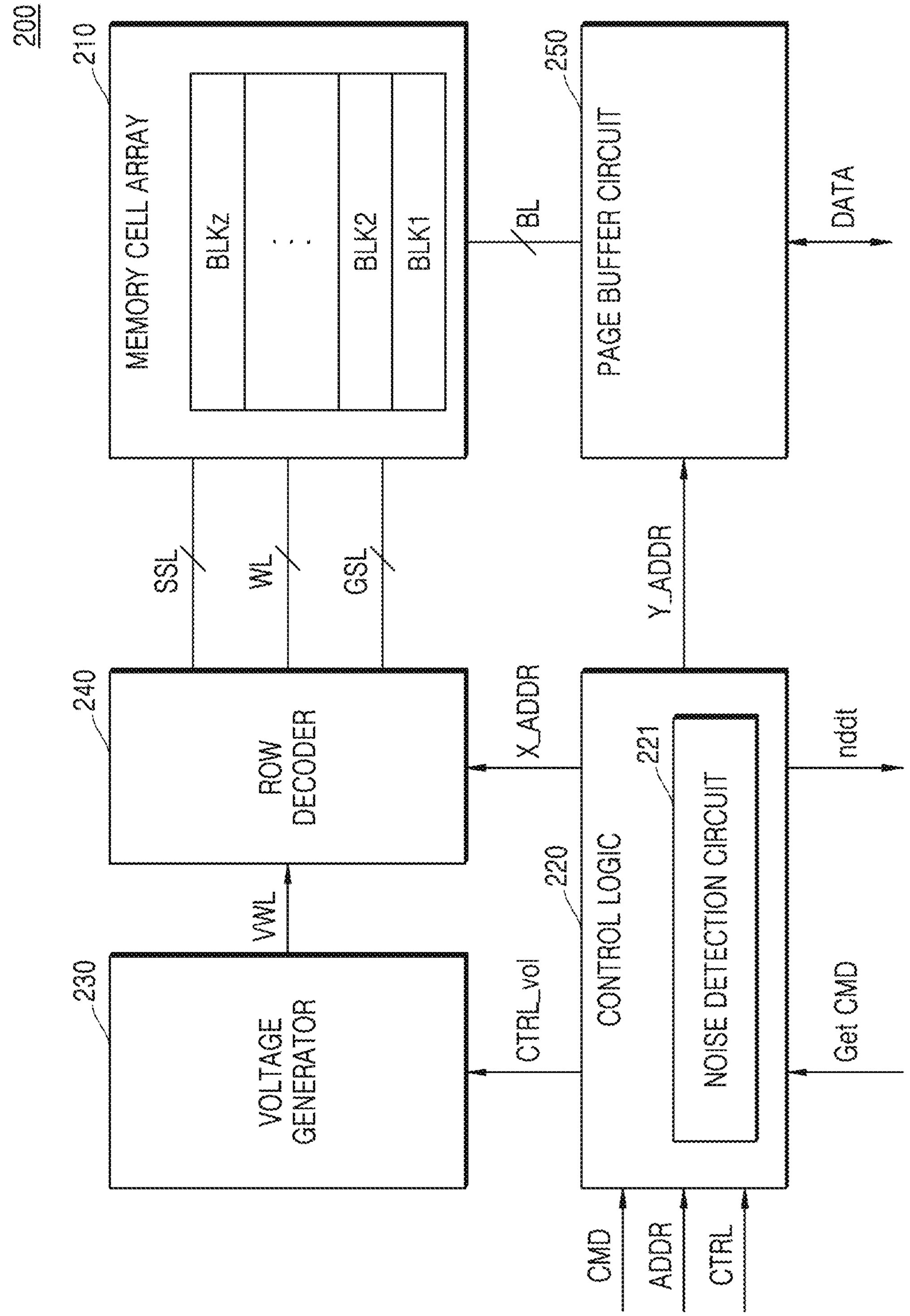
FIG. 3 is a diagram illustrating a memory device according to some implementations.

FIG. 3 is a diagram illustrating the memory device 200 according to some implementations. The redundant descriptions as those given with reference to FIG. 1 are omitted.

Referring to FIG. 3, the memory device 200 may include the memory cell array 210, the control logic 220, a voltage generator 230, a row decoder 240, and a page buffer circuit 250.

The memory cell array 210 may include a plurality of memory cells and may be connected to word lines WL, string selection lines SSL, ground selection lines GSL, and a plurality of bit lines BL. Specifically, the memory cell array 210 may be connected to the row decoder 240 through the word lines WLs, the string selection lines SSL, and the ground selection lines GSL, and may be connected to the page buffer circuit 250 through the plurality of bit lines BLs.

The memory cell array 210 may include a plurality of memory blocks, and for example, each of the plurality of memory blocks may include a plurality of memory cells. Each of the plurality of memory blocks may have a three-dimensional (3D) structure (or a vertical structure). The plurality of memory blocks may be selected by the row decoder 240. For example, the row decoder 240 may select a memory block corresponding to a block address from among the plurality of memory blocks.

The control logic 220 may generally control various operations in the memory device 200. For example, the control logic 220 may output various control signals for writing data to the memory cell array 210 or reading data from the memory cell array 210 based on a command CMD, an address ADDR, and a control signal CTRL. For example, the control logic 220 may output a voltage control signal CTRL_vol, a row address X_ADDR, and a column address Y_ADDR. The various control signals output from the control logic 220 may be provided to the voltage generator 230, the row decoder 240, and the page buffer circuit 250. The control logic 220 may provide the voltage control signal CTRL_vol to the voltage generator 230.

The control logic 220 may be connected to a first bus (e.g., the first bus B1 of FIG. 1). The control logic 220 may receive the command CMD and the address ADDR through the first bus B1. The control logic 220 may receive a command-address signal (e.g., the command-address signal CA of FIG. 1) through the first bus B1, and the command-address signal CA may include the command CMD and the address ADDR.

In some implementations, the control logic 220 may include a noise detection circuit 221. The noise detection circuit 221 may generate noise detection data nddt by detecting whether noise occurred in power provided to the memory device 200 during a DMA operation. The noise detection circuit 221 may detect power noise in a first DMA operation period and detect power noise in a second DMA operation period. For example, the noise detection circuit 221 may detect power noise at a specific time or every specific time during the DMA operation period but is not necessarily limited thereto.

The noise detection circuit 221 may store the noise detection data nddt in a latch circuit. In some implementations, the latch circuit may be included in the control logic 220, but it is not necessarily limited thereto, and the latch circuit may be outside the control logic 220.

The noise detection circuit 221 may transmit the noise detection data nddt to the outside of the memory device 200. The noise detection circuit 221 may transmit the noise detection data nddt in response to a get feature command Get CMD. The noise detection circuit 221 may receive the get feature command Get CMD within the DMA operation period through the first bus B1. The noise detection circuit 221 may receive the get feature command Get CMD within a period in which operation data DATA stored in the memory cell array 210 is transmitted to the page buffer circuit 250 or a period in which the operation data DATA temporarily stored in the page buffer circuit 250 is transmitted to a memory controller (e.g., the memory controller 100 of FIG. 1).

The noise detection circuit 221 may output the noise detection data nddt when receiving the get feature command Get CMD. For example, the noise detection circuit 221 may control the latch circuit to output the noise detection data nddt. The noise detection data nddt may be transmitted to the memory controller 100 through the first bus B1. FIG. 3 illustrates that the noise detection circuit 221 is included in the control logic 220, but implementations are not necessarily limited thereto, and the noise detection circuit 221 may be separated from the control logic 220.

The voltage generator 230 may generate various types of voltages for performing write, read, and erase operations on the memory cell array 210 based on the voltage control signal CTRL_vol. Specifically, the voltage generator 230 may generate a word line voltage VWL, for example, a write voltage, a read voltage, an erase voltage, etc. For example, during the read operation, the voltage generator 230 may generate the read voltage by the control of the control logic 220 and provide the read voltage to the row decoder 240. In addition, the voltage generator 30 may further generate a string selection line voltage and a ground selection line voltage based on the voltage control signal CTRL_vol.

The row decoder 240 may select a specific word line from among the word lines WLs in response to the row address X_ADDR received from the control logic 220. For example, during the read operation, the row decoder 240 may provide the read voltage to the selected word line. In addition, the row decoder 240 may select some of the string selection lines SSL or some of the ground selection lines GSL in response to the row address X_ADDR received from the control logic 220.

The page buffer circuit 250 may be coupled to the memory cell array 210 through the plurality of bit lines BL. The page buffer circuit 250 may select some of the plurality of bit lines BL in response to the column address Y_ADDR received from the control logic 220. The page buffer circuit 250 may temporarily store data read from the memory cell array 210. During the read operation, the page buffer circuit 250 may sense the read operation data DATA from the memory cell array 210 and temporarily store the read operation data DATA. The page buffer circuit 250 may temporarily store the operation data DATA to be stored in the memory cell array 210.

In some implementations, the page buffer circuit 250 may be connected to a second bus (e.g., the second bus B2 of FIG. 1). The page buffer circuit 250 may transmit and receive the operation data DATA through the second bus B2. The page buffer circuit 250 may transmit the operation data DATA to a memory controller (e.g., the memory controller 100 of FIG. 1) through the second bus B2, or may receive the operation data DATA through the second bus B2. The page buffer circuit 250 may receive a data signal (e.g., the data signal DQ of FIG. 1) through the second bus B2, and the data signal DQ may include operation data DATA.

The page buffer circuit 250 may include a plurality of page buffers coupled to the plurality of bit lines BL, respectively. The plurality of page buffers may be respectively disposed in correspondence to the plurality of bit lines BL, and each page buffer may include a plurality of latches. The page buffer circuit 250 may be defined as including the page buffers respectively connected to the bit lines BL. However, the term may be differently defined in some implementations. For example, one page buffer may be provided in correspondence to a number of bit lines, and a unit of configuration disposed in correspondence to each bit line may be defined as a page buffer unit.

The memory device 200 may receive the get feature command Get CMD in parallel with the operation data DATA and transmit the noise detection data nddt, thereby determining in real time whether noise has occurred in power during the DMA operation, and reducing overhead at the time of noise detection.

Figure 4:
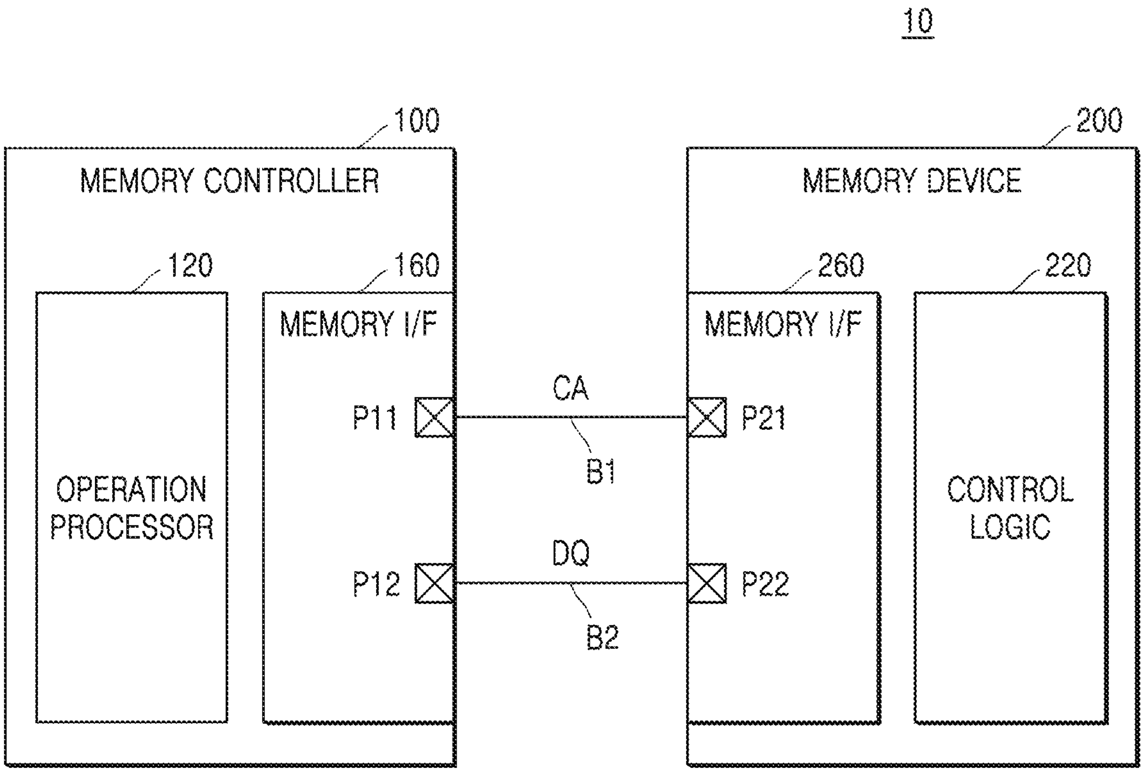
FIG. 4 is a diagram for explaining a memory system according to some implementations.

FIG. 4 is a diagram for explaining the memory system 10 according to some implementations. Specifically, FIG. 4 is a diagram for explaining an SCA protocol. The memory system 10, the memory controller 100, the memory device 200, and the control logic 220 of FIG. 4 respectively correspond to the memory system 10, the memory controller 100, the memory device 200, and the control logic 220 of FIG. 1, and thus, redundant descriptions thereof are omitted.

Referring to FIG. 4, the memory system 10 includes the memory controller 100 and the memory device 200, and the memory device 200 may communicate with the memory controller 100 based on the first bus B1 and the second bus B2.

The memory controller 100 may include the operation processor 120 and the memory interface 160. The memory controller 100 may include a first pin P11 and a second pin P12. The memory device 200 may include a first pin P21 and a second pin P22. The first pin P11 and the second pin P12 may correspond to the first pin P21 and the second fin P22. The first pin P11 and the first pin P21 may be connected to the first bus B1, and the second pin P12 and the second pin P22 may be connected to the second bus B2. The memory controller 100 and the memory device 200 may transmit and receive signals with respect to each other through the first pin P11 and the second pin P12 and the first pin P21 and the second pin P22. FIG. 2 illustrates that the memory controller 100 and the memory device 200 each include two pins, but this is for convenience of description and implementations are not necessarily limited thereto. For example, the memory system 10 may further include buses and pins for transmitting a chip enable (CE) signal, a command latch enable (CLE) signal, an address latch enable (ALE) signal, etc.

The memory interface 160 may transmit the command-address signal CA to the memory device 200 through the first pin P11. In addition, the memory interface 160 may transmit the data signal DQ to the memory device 200 or receive the data signal DQ from the memory device 200 through the second pin P12.

The memory interface 160 may transmit a get feature command to the memory device 200 through the first pin P11. The operation processor 120 may transmit the get feature command through the first bus B1. Specifically, the operation processor 120 may transmit the get feature command through the memory interface 160. The operation processor 120 may transmit the get feature command within a DMA operation period.

The operation processor 120 may receive noise detection data in response to the get feature command. The operation processor 120 may receive the noise detection data through the memory interface 160. The memory interface 160 may receive the noise detection data through the first pin P11.

The operation processor 120 may determine whether noise is detected during a DMA operation based on the noise detection data. The operation processor 120 may determine whether to re-perform the DMA operation based on whether noise is detected. When power noise is detected during the DMA operation, the operation processor 120 may perform the DMA operation again. When power noise is not detected during the DMA operation, the operation processor 120 may not perform the DMA operation again. For example, when it is determined that power noise is detected during a first DMA operation, the operation processor 120 may perform the first DMA operation again. When it is determined that power noise is detected during a second DMA operation, the operation processor 120 may perform the second DMA operation again.

The memory device 200 may include a memory interface 260 and the control logic 220. The memory interface 260 may receive the command-address signal CA from the memory controller 100 through the first pin P21. Commands and addresses may be transmitted through the command-address signal CA. In addition, the memory interface 260 may transmit the data signal DQ to the memory controller 100 or receive the data signal DQ from the memory controller 100 through the second pin P22. For example, operation data may be transmitted from the memory controller 100 to the memory device 200 through the data signal DQ. Sensed operation data may be transmitted from the memory device 200 to the memory controller 100 through the data signal DQ.

The control logic 220 may detect power noise during the DMA operation. The control logic 220 may detect power noise during the DMA operation in which the data signal DQ is transmitted and received through the second pin P22 and generate noise detection data.

The control logic 220 may receive the get feature command through the first bus B1. Specifically, the memory interface 260 may receive the get feature command through the first pin P21. The control logic 220 may receive the get feature command within the DMA operation period.

The control logic 220 may transmit the noise detection data in response to the get feature command. The control logic 220 may transmit the noise detection data through the memory interface 260.

Figure 5:
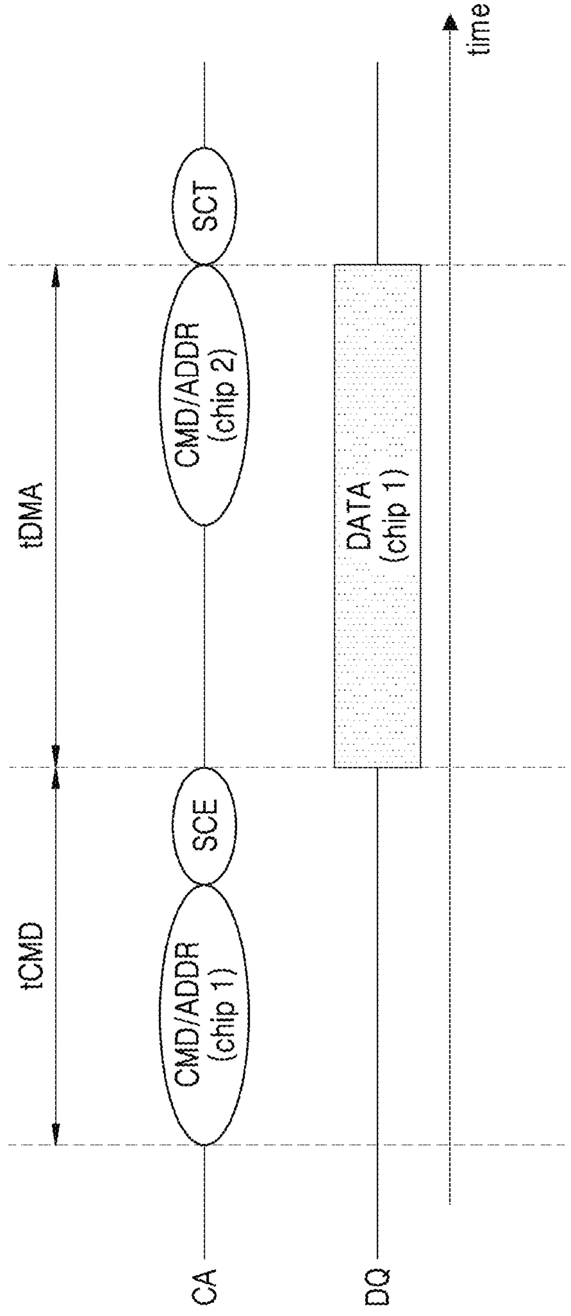
FIG. 5 is a timing diagram for explaining a signal according to some implementations.

FIG. 5 is a timing diagram for explaining a signal according to some implementations. Specifically, FIG. 5 illustrates the command-address signal CA and the data signal DQ. In FIG. 5, the horizontal axis indicates time. The redundant descriptions as those given above are omitted.

Referring to FIGS. 4 and 5, the memory controller 100 may transmit the command-address signal CA through the first bus B1 and transmit or receive the data signal DQ through the second bus B2. In some implementations, the memory device 200 may include a plurality of chips. For example, the memory device 200 may be described as including a first chip and a second chip, but this is only an example, and the memory device 200 may further include a plurality of memory chips.

The memory controller 100 may provide the command-address signal CA during a command period tCMD through the first bus B1. The memory device 200 may receive the command-address signal CA. For example, the memory controller 100 may transmit the command-address signal CA with respect to a first chip chip 1 during the command period tCMD. The memory controller 100 may provide the command-address signal CA with respect to a write operation during the command period tCMD. The memory controller 100 may provide the command-address signal CA with respect to a read operation during the command period tCMD.

The memory controller 100 may provide the command CMD and the address ADDR included in the command-address signal CA to the memory device 200. For example, the memory controller 100 may transmit the command CMD and the address ADDR and then provide an operation execution signal SCE. The operation execution signal SCE may be provided to the memory device 200 through the first bus B1. The operation execution signal SCE may be included in the command-address signal CA. When transmission of the command CMD and the address ADDR is completed, the operation performance signal SCE with respect to the chip may be transmitted. For example, when the transmission of the command CMD and the address ADDR with respect to the first chip chip 1 is completed, the operation execution signal SCE with respect to the first chip chip 1 may be transmitted. Upon receiving the operation execution signal SCE, the memory device 200 may perform a memory operation corresponding to the command CMD and the address ADDR. For example, upon receiving the operation execution signal SCE, the memory device 200 may perform a write operation indicated by a write command. Upon receiving the operation execution signal SCE, the memory device 200 may perform a read operation indicated by a read command.

The memory controller 100 may provide the data signal DQ to the memory device 200 or receive the data signal DQ from the memory device 200 during the DMA operation period tDMA through the second bus B2. The memory controller 100 may perform a DMA operation on the data signal DQ corresponding to the command-address signal CA provided during the command period tCMD. For example, the memory controller 100 may transmit or receive the data signal DQ with respect to the first chip chip 1 during the DMA operation period tDMA. The DMA operation period tDMA may be a time period following the command period tCMD.

When providing the command-address signal CA with respect to the write operation, the memory controller 100 may transmit the write operation data DATA included in the data signal DQ to the memory device 200. That is, the memory controller 100 may perform a first DMA operation. When providing the command-address signal CA for the read operation, the memory controller 100 may receive the read operation data DATA included in the data signal DQ from the memory device 200. That is, the memory controller 100 may perform a second DMA operation.

While the memory controller 100 provides the data signal DQ to the memory device 200 or receives the data signal DQ from the memory device 200 through the second bus B2, the command-address signal CA with respect to another chip may be provided through the first bus B1. For example, the memory controller 100 may provide the command-address signal CA with respect to a second chip chip 2 through the second bus B2 during the DMA operation period tDMA with respect to the first chip chip 1. The memory controller 100 may simultaneously transmit the command-address signal CA and the data signal DQ during the first DMA operation. The memory controller 100 may simultaneously receive the data signal DQ and transmit the command-address signal CA during the second DMA operation.

For example, when the DMA operation is completed, the memory controller 100 may provide an operation completion signal SCT to the memory device 200. The operation completion signal SCT may be provided to the memory device 200 through the first bus B1. The operation completion signal SCT may be included in the command-address signal CA. When transmission of the operation data DATA to the memory device 200 is completed or reception of the operation data DATA from the memory device 200 is completed, the operation completion signal SCT may be transmitted. For example, when the DMA operation with respect to the first chip chip 1 is completed, the operation completion signal SCT with respect to the first chip chip 1 may be transmitted.

Figure 6:
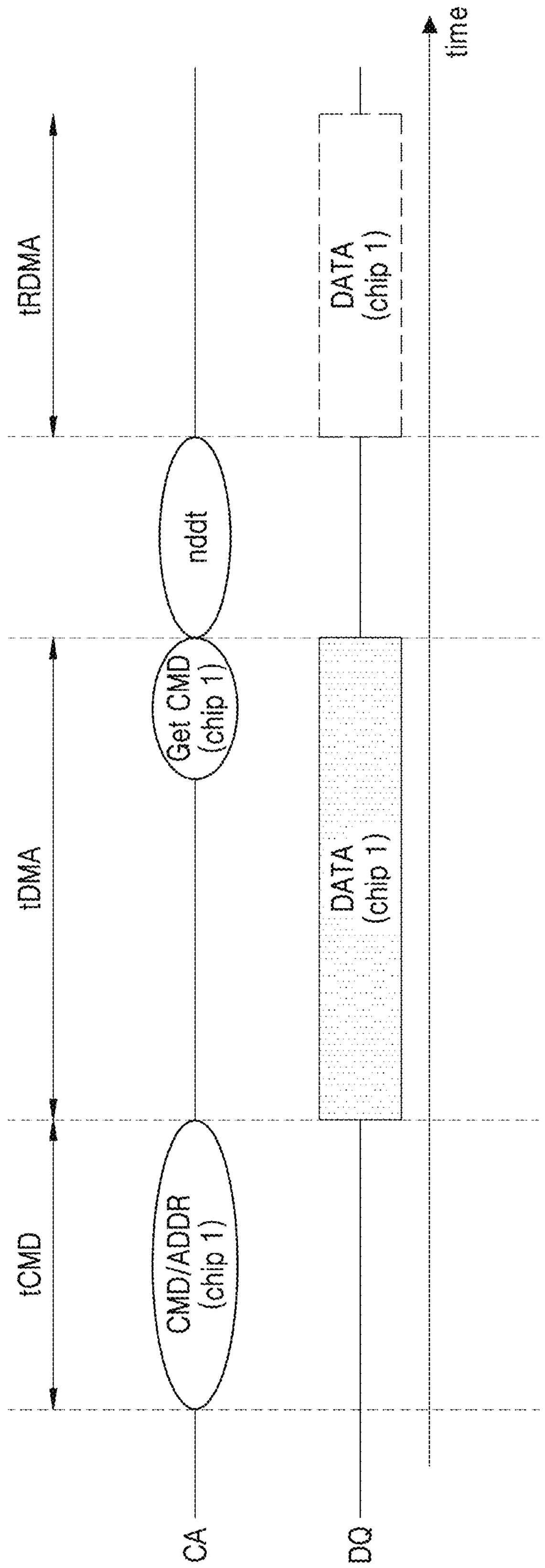
FIG. 6 is a timing diagram for explaining noise detection data according to some implementations.

FIG. 6 is a timing diagram for explaining the noise detection data nddt according to some implementations. In FIG. 6, the operation execution signal SCE and the operation completion signal SCT shown in FIG. 5 are omitted for convenience of description, but the memory controller 100 may transmit the operation execution signal SCE and the operation completion signal SCT. The redundant descriptions as those given with reference to FIG. 5 are omitted.

Referring to FIGS. 4 and 6, the memory device 200 may detect power noise during a DMA operation. The memory device 200 may detect power noise during the DMA operation period tDMA and generate the noise detection data nddt. The memory device 200 may detect power noise at a single specific time during the DMA operation period tDMA. However, implementations are not necessarily limited thereto, and the memory device 200 may detect power noise at a plurality of specific times during the DMA operation period tDMA. Also, for example, the memory device 200 may detect power noise based on a time at which the get feature command Get CMD is received.

The memory controller 100 may transmit the get feature command Get CMD to the memory device 200 during the DMA operation period tDMA. The memory controller 100 may transmit the get feature command Get CMD with respect to the same chip to the memory device 200 during the DMA operation period tDMA. For example, the memory controller 100 may transmit the get feature command Get CMD with respect to the first chip chip 1 through the second bus B2 during the DMA operation period tDMA with respect to the first chip chip 1. For example, the memory controller 100 may transmit the get feature command Get CMD to the memory device 200 in a relatively later part of the DMA operation period tDMA.

The memory device 200 may output the noise detection data nddt in response to the get feature command Get CMD. When the memory device 200 receives the get feature command Get CMD, the memory device 200 may transmit the noise detection data nddt to the memory controller 100. For example, the memory device 200 may transmit the noise detection data nddt through the first bus B1.

The memory controller 100 may receive the noise detection data nddt from the memory device 200. After transmitting the get feature command Get CMD to the memory device 200, the memory controller 100 may receive the noise detection data nddt.

The memory controller 100 may determine whether noise is detected during the DMA operation based on the noise detection data nddt. In some implementations, the memory controller 100 may determine whether noise is detected based on the noise detection data nddt. The memory controller 100 may determine whether noise is detected based on a bit value of the noise detection data nddt. For example, when the bit value of the noise detection data nddt is a first value, the memory controller 100 may determine that noise is detected in power during a DMA operation. When the bit value of the noise detection data nddt is a second value, the memory controller 100 may determine that noise is not detected in in power during the DMA operation. For example, the first value may be 1 and the second value may be 0. However, implementations are not limited thereto, and the first value may be 0 and the second value may be 1.

The memory controller 100 may determine whether to re-perform the DMA operation based on whether noise is detected. When power noise is detected during the DMA operation, the memory controller 100 may perform the DMA operation again. After receiving the noise detection data nddt, the memory controller 100 may perform the DMA operation again in a re-DMA operation period tRDMA. When power noise is detected during the DMA operation, the memory controller 100 may transmit the operation data DATA back to the memory device 200 or receive the operation data DATA back from the memory device 200 during the re-DMA operation period tRDMA. For example, when power noise is detected during the DMA operation on the first chip chip 1, the memory controller 100 may perform the DMA operation on the first chip chip 1 again during the re-DMA operation period tRDMA.

In some implementations, the memory controller 100 may stop applying the command CMD during a period in which the DMA operation is performed again. When power noise is detected during the DMA operation and the DMA operation is performed again, the memory controller 100 may not transmit the command CMD to the memory device 200 through the first bus B1 during the re-DMA operation period tRDMA. When the command CMD with respect to another chip is transmitted through the first bus B1 while the DMA operation is being performed through the second bus B2, noise may occur in power even when the DMA operation is performed again. In order to minimize errors caused by power noise, the memory controller 100 may not transmit the command CMD to the memory device 200 during the re-DMA operation period tRDMA.

When power noise is not detected during the DMA operation, the memory controller 100 may not perform the DMA operation again. When power noise is not detected, the memory controller 100 may not perform the DMA operation again after receiving the noise detection data nddt. For example, when power noise is not detected during the DMA operation on the first chip chip 1, the memory controller 100 may not perform the DMA operation on the first chip chip 1 again.

Figure 7:
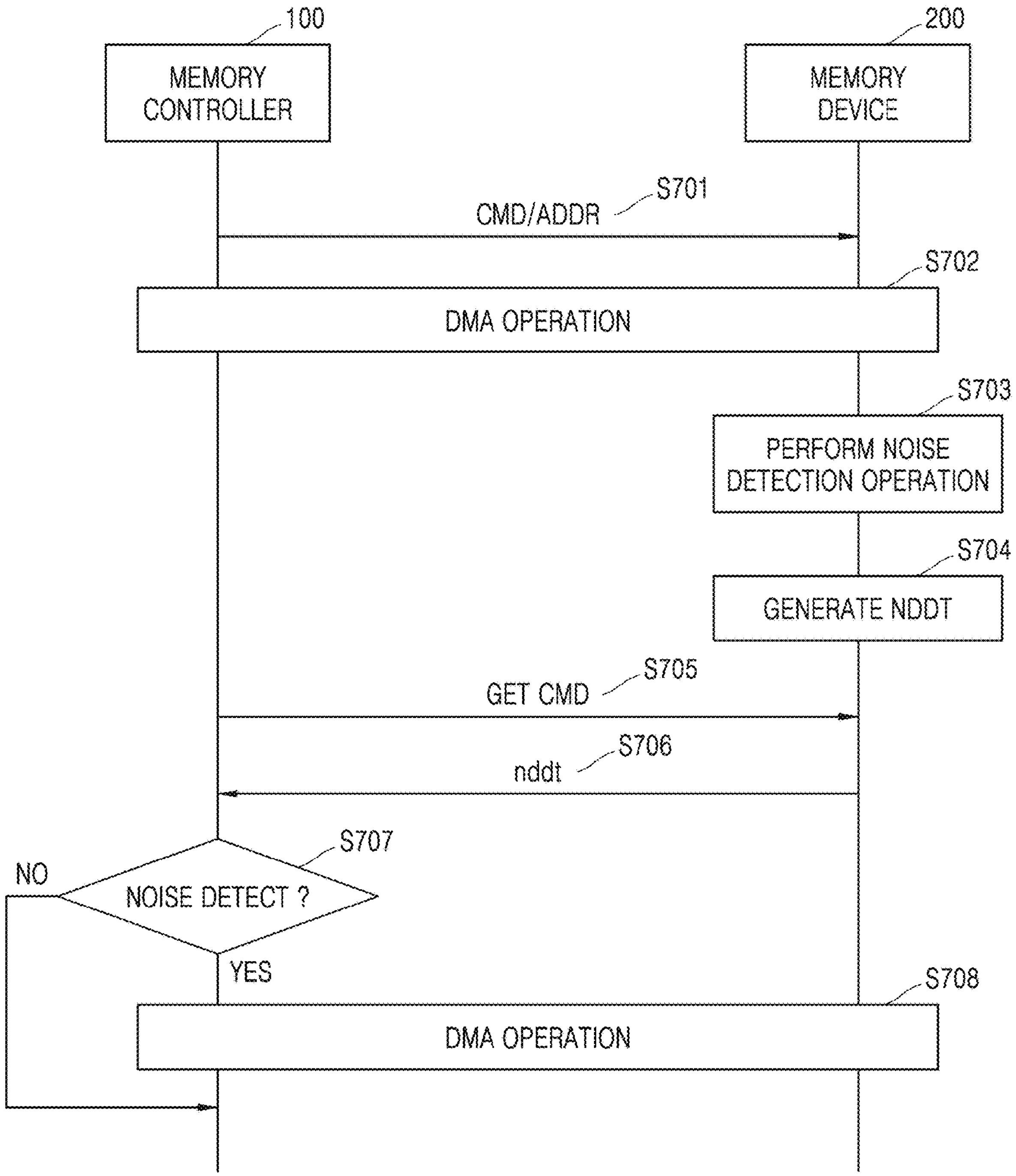
FIG. 7 is a flowchart for explaining an operating method of a memory system according to some implementations.

FIG. 7 is a flowchart for explaining an operating method of a memory system according to some implementations.

Referring to FIGS. 1 and 7, the memory controller 100 may transmit the command CMD and the address ADDR to the memory device 200 in operation S701. The memory controller 100 may provide the command-address signal CA to the memory device 200 through the first bus B1. The command-address signal CA may include the command CMD and the address ADDR required for the memory controller 100 to instruct the memory device 200 to operate.

In a write operation, the memory controller 100 may transmit the write command CMD and the address ADDR to the memory device 200 as the command-address signal CA. In a read operation, the memory controller 100 may transmit the read command CMD and the address ADDR to the memory device 200 as the command-address signal CA.

In operation S702, the memory controller 100 and the memory device 200 may perform a DMA operation. The memory controller 100 may perform the DMA operation of transmitting operation data to the memory device 200 or receiving operation data from the memory device 200. The memory device 200 may perform the DMA operation of receiving operation data from the memory controller 100 or transmitting operation data to the memory controller 100.

The memory controller 100 may perform the DMA operation through the second bus B2. The memory controller 100 may transmit and receive the data signal DQ to and from the memory device 200 through the second bus B2. The memory device 200 may receive the data signal DQ from the memory controller 100 or transmit the data signal DQ to the memory controller 100 through the second bus B2. The data signal DQ may include operation data.

A DMA operation corresponding to the command CMD transmitted in operation S701 may be performed. For example, the memory controller 100 may perform a first DMA operation of transmitting the data signal DQ to the memory device 200 through the second bus B2 during the write operation. During the write operation, the memory controller 100 may transmit write operation data corresponding to the write command CMD to the memory device 200. The memory controller 100 may perform a second DMA operation of receiving the data signal DQ from the memory device 200 through the second bus B2 during the read operation. During the read operation, the memory device 200 may transmit read operation data corresponding to the read command CMD to the memory device 200 through the second bus B2.

In operation S703, the memory device 200 may perform a noise detection operation. The memory device 200 may detect whether noise occurred in power provided to the memory device 200 during the DMA operation. The memory device 200 may detect power noise during the DMA operation of transmitting or receiving the operation data to or from the memory device 200 as the data signal DQ. The memory device 200 may detect the power noise during operation S702.

The memory device 200 may detect the power noise in a first DMA operation period and detect the power noise in a second DMA operation period. When receiving the command-address signal CA of the write operation, the memory device 200 may detect the power noise in the first DMA operation period. When receiving the command-address signal CA of the read operation, the memory device 200 may detect the power noise in the second DMA operation period.

The memory device 200 may detect the power noise by comparing a power value of power provided to the memory device 200 with a reference value. For example, the memory device 200 may detect the power noise by comparing a voltage that is the power value with a voltage that is the reference value.

The memory device 200 may obtain the reference value corresponding to the DMA operation based on DMA information indicating information about the DMA operation. The DMA information may include information indicating whether it is a first DMA operation or a second DMA operation, a command, information indicating a DMA operation period, etc. For example, the reference value may be a voltage value preset or stored in the memory device 200.

In some implementations, the reference value may vary depending on the DMA operation. For example, the memory device 200 may detect the power noise in the first DMA operation by comparing a first reference value with the power value of power. The memory device 200 may detect the power noise in the second DMA operation by comparing a second reference value with the power value of power In operation S704, the memory device 200 may generate noise detection data nddt. The memory device 200 may perform operation S703 to generate the noise detection data nddt. For example, the noise detection data nddt may include information indicating whether power noise has been detected, a type of DMA operation, etc. For example, the noise detection data nddt may indicate whether power noise has been detected during the first DMA operation, or whether power noise has been detected during the second DMA operation.

Operations S703 and S704 are shown to follow operation S702 but are not necessarily limited thereto. Operations S703 and S704 may be performed at various times. For example, operations S703 and S704 may be performed simultaneously with operation S702, or may be performed after operation S705.

In operation S705, the memory controller 100 may transmit the get feature command Get CMD to the memory device 200. The memory controller 100 may transmit the get feature command Get CMD to the memory device 200 to determine whether power noise has been detected during the DMA operation (operation S702). In FIG. 7, operation S705 is shown to follow operation S702, but is not necessarily limited thereto, and operation S705 may also be performed simultaneously with operation S702. In some implementations, the get feature command Get CMD may be transmitted to the memory device 200 during operation S702. The memory controller 100 may transmit the get feature command Get CMD within the DMA operation period.

The memory controller 100 may transmit the get feature command Get CMD to the memory device 200 through the first bus B1. The memory controller 100 may transmit the get feature command Get CMD to the memory device 200 through the first bus B1 even during the DMA operation of transmitting or receiving the operation data to or from the memory device 200 through the second bus B2. Because the command-address signal CA and the data signal DQ are separated and transmitted through different buses, the memory controller 100 may transmit the get feature command Get CMD even during the DMA operation.

In operation S706, the memory device 200 may transmit the noise detection data nddt to the memory controller 100.

In some implementations, the memory device 200 may transmit the noise detection data nddt in response to the get feature command Get CMD.

Upon receiving the get feature command Get CMD, the memory device 200 may transmit the noise detection data nddt to the memory controller 100. The memory device 200 may transmit the noise detection data nddt to the memory controller 100 through the first bus B1. The memory device 200 may transmit the noise detection data nddt through the first bus B1 that is the same as the bus receiving the get feature command Get CMD.

In operation S707, the memory controller 100 may determine whether noise has been detected based on the noise detection data nddt. The memory controller 100 may determine whether noise is detected during the DMA operation based on the noise detection data nddt.

In some implementations, the memory controller 100 may determine whether noise is detected based on a bit value of the noise detection data nddt. For example, when the bit value of the noise detection data nddt is a first value, the memory controller 100 may determine that noise is detected in power during the DMA operation. When the bit value of the noise detection data nddt is a second value, the memory controller 100 may determine that noise is not detected in power during the DMA operation.

The memory controller 100 may determine whether to re-perform the DMA operation based on whether noise is detected. When power noise is detected during the DMA operation, the memory controller 100 may perform the DMA operation again. When power noise is detected during the DMA operation, the memory controller 100 may perform operation S708. When power noise is not detected during the DMA operation, the memory controller 100 may not perform the DMA operation again. When power noise is not detected during the DMA operation, the memory controller 100 may not perform operation S708.

In operation S708, the memory controller 100 and the memory device 200 may perform the DMA operation again. For example, when it is determined that power noise is detected during a first DMA operation, the memory controller 100 may perform the first DMA operation again. The memory controller 100 may transmit the operation data to the memory device 200 again through the second bus B2. When it is determined that power noise is detected during a second DMA operation, the memory controller 100 may perform the second DMA operation again. The memory device 200 may transmit sensed data again through the second bus B2. The memory controller 100 may receive the operation data from the memory device 200 again through the second bus B2.

As described above, the memory device 200 and the memory controller 100 determine whether noise has occurred in power during the DMA operation, and, even when power noise is detected during the DMA operation, re-perform the DMA operation only instead of the entire memory operation, thereby detecting noise in real time, and reducing errors caused by power noise.

Figure 8:
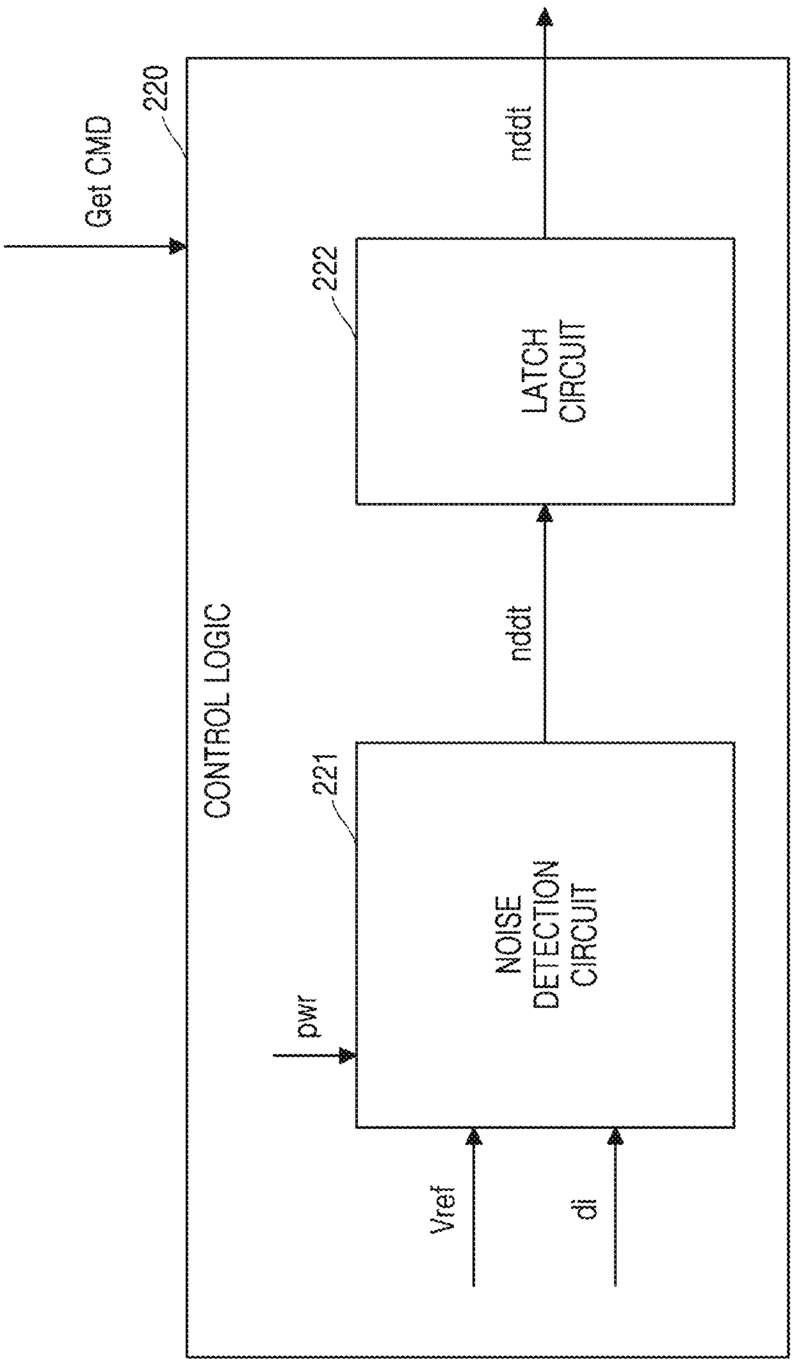
FIG. 8 is a block diagram for explaining a control logic according to some implementations.

FIG. 8 is a block diagram for explaining the control logic 220 according to some implementations. The control logic 220 may be included in a memory device (e.g., the memory device 200 of FIG. 1). The redundant descriptions as those given above are omitted.

Referring to FIG. 8, the control logic 220 may include the noise detection circuit 221 and a latch circuit 222. The noise detection circuit 221 may generate the noise detection data nddt by detecting noise generated in power provided to the memory device 200 during a DMA operation.

The noise detection circuit 221 may receive DMA information Di indicating information on the DMA operation and a reference value Vref. The noise detection circuit 221 may obtain the reference value Vref corresponding to the DMA operation based on the DMA information Di. The DMA information Di may include information indicating whether it is a first DMA operation or a second DMA operation, a command, information indicating a DMA operation period, etc. The reference value Vref may be a value preset or stored in the memory device 200.

The noise detection circuit 221 may receive a power value pwr of power. The noise detection circuit 221 may generate the noise detection data nddt by comparing the power value pwr with the reference value Vref. However, implementations are not necessarily limited thereto, and the power provided to the control logic 220 may include various powers such as a ground power and an external power. For example, the noise detection circuit 221 may detect power noise when the power value pwr is lower than the reference value Vref. The noise detection circuit 221 may store the noise detection data nddt in the latch circuit 222.

The latch circuit 222 may store the noise detection data nddt. In some implementations, the latch circuit 222 may be included in the control logic 220, but it is not necessarily limited thereto, and the latch circuit 222 may be outside the control logic 220.

The noise detection circuit 221 may transmit the noise detection data nddt to the outside of the memory device 200. The noise detection circuit 221 may transmit the noise detection data nddt to a memory controller (e.g., the memory controller 100 of FIG. 1) in response to the get feature command Get CMD. The noise detection circuit 221 may output the noise detection data nddt when receiving the get feature command Get CMD. For example, the noise detection circuit 221 may control the latch circuit 222 to output the noise detection data nddt. The latch circuit 222 may transmit the noise detection data nddt to the memory controller 100 in response to the get feature command Get CMD.

Figure 9:
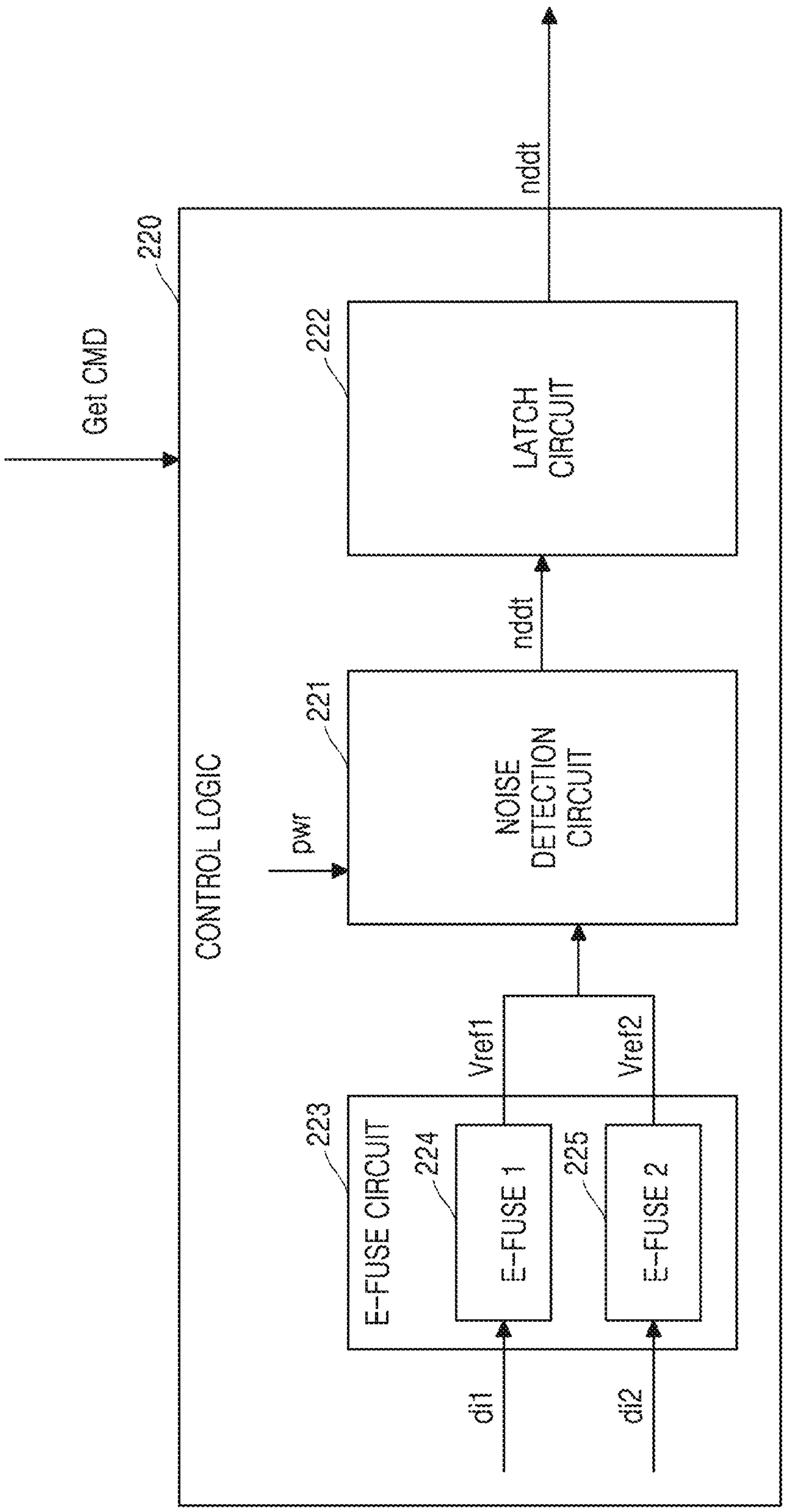
FIG. 9 is a diagram for explaining an operation of a control logic according to some implementations.

FIG. 9 is a diagram for explaining an operation of the control logic 220 according to some implementations. The redundant descriptions as those given above are omitted.

Referring to FIG. 9, the control logic 220 may include the noise detection circuit 221 and the latch circuit 222. The control logic 220 may further include an OTP memory device. The control logic 220 may further include an e-fuse circuit 223. The OTP memory device may store a reference value. In FIG. 9, a case where the OTP memory device is the e-fuse circuit 223 will be described.

The e-fuse circuit 223 may store the reference value Vref. In some implementations, the e-fuse circuit 223 may store the reference value Vref according to a DMA operation. The e-fuse circuit 223 may include a first e-fuse 224 and a second e-fuse 225, and the first e-fuse 224 and the second e-fuse 225 may store different reference values Vref. For example, the first e-fuse 224 may store a first reference value Vref1 corresponding to a first DMA operation, and the second e-fuse 225 may store a second reference value Vref2 corresponding to a second DMA operation. However, implementations are not necessarily limited thereto, and the noise detection circuit 221 may detect power noise in the first DMA operation and the second DMA operation based on the same reference value Vref, and the e-fuse circuit 223 may include one e-fuse. The e-fuse circuit 223 may include a plurality of e-fuses.

The e-fuse circuit 223 may output the reference value Vref corresponding to the DMA operation based on the DMA information Di. The e-fuse circuit 223 may output the first reference value Vref1 based on first DMA information Di1 indicating the first DMA operation. In a write operation, the first DMA operation may be performed, and the first reference value Vref1 may be output from the first e-fuse 224 to detect power noise in the first DMA operation. The e-fuse circuit 223 may output the second reference value Vref2 based on second DMA information Di2 indicating the second DMA operation. In a read operation, the second DMA operation may be performed, and the second reference value Vref2 may be output from the second e-fuse 225 to detect power noise in the second DMA operation.

The noise detection circuit 221 may receive the reference value Vref from the e-fuse circuit 223. The noise detection circuit 221 may receive the first reference value Vref1 in the first DMA operation and receive the second reference value Vref2 in the second DMA operation. The noise detection circuit 221 may detect the power noise of the first DMA operation by comparing the first reference value Vref1 with the power value pwr within a first DMA operation period corresponding to the write operation. The noise detection circuit 221 may generate the noise detection data nddt of the first DMA operation by comparing the first reference value Vref1 with the power value pwr.

The noise detection circuit 221 may detect the power noise of the second DMA operation by comparing the second reference value Vref2 and the power value pwr within the second DMA operation period corresponding to the read operation. The noise detection circuit 221 may generate the noise detection data nddt of the second DMA operation by comparing the second reference value Vref2 with the power value pwr.

In some implementations, the e-fuse circuit 223 may be included in the control logic 220, but it is not necessarily limited thereto, and the e-fuse circuit 223 may be outside the control logic 220. In addition, FIG. 9 illustrates that the first reference value Vref1 and the second reference value Vref2 are transmitted to the noise detection circuit 221 through the same line, but implementations are not necessarily limited thereto, and the first reference value Vref1 and the second reference value Vref2 may be transmitted to the noise detection circuit 221 through separate lines.

Figure 10A:
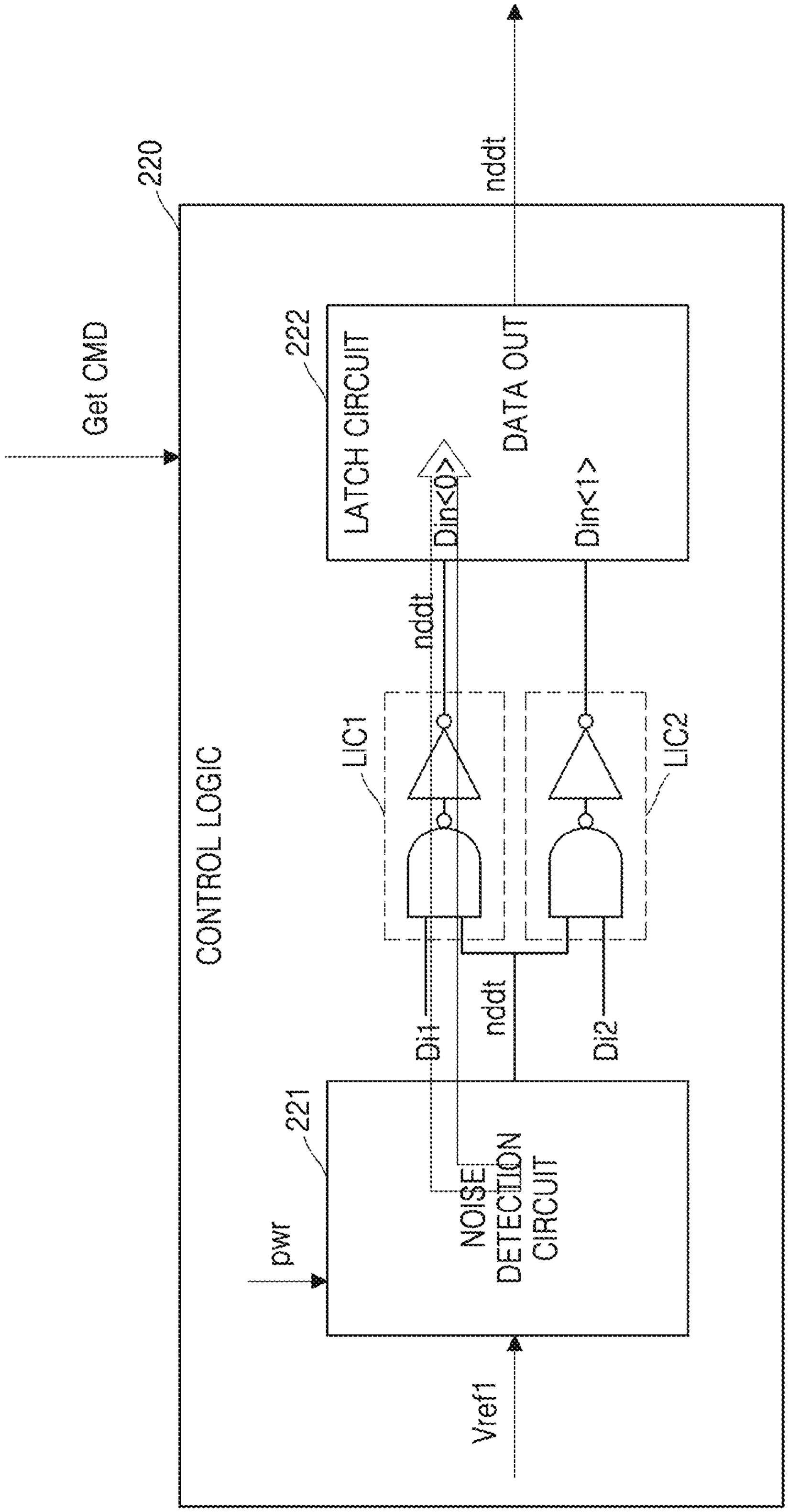
FIG. 10A is a diagram for explaining noise detection data of a first direct memory access (DMA) operation according to some implementations.

FIG. 10A is a diagram for explaining noise detection data of a first DMA operation according to some implementations. Specifically, FIG. 10A illustrates an operation of the control logic 220 in the first DMA operation. The redundant descriptions as those given above are omitted.

Referring to FIG. 10A, the noise detection circuit 221 may obtain the first reference value Vref1. The noise detection circuit 221 may generate the noise detection data nddt of the first DMA operation by comparing the first reference value Vref1 with the power value pwr.

The control logic 220 may further include a first latch input circuit LIC1 and a second latch input circuit LIC2. The first latch input circuit LIC1 may correspond to the first DMA operation. The second latch input circuit LIC2 may correspond to a second DMA operation. The first latch input circuit LIC1 may receive the first DMA information Di1 and the noise detection data nddt of the first DMA operation. The first latch input circuit LIC1 may be enabled during the first DMA operation. The first latch input circuit LIC1 may include a NAND gate and an inverter device. The noise detection data nddt of the first DMA operation may be transmitted to the latch circuit 222 through the first latch input circuit LIC1.

The latch circuit 222 may store the noise detection data nddt of the first DMA operation in a first bit Din<0> of the latch circuit 222. When power noise is detected during the first DMA operation, a bit value of the noise detection data nddt of the first DMA operation may be stored as a first value. When power noise is not detected during the first DMA operation, the bit value of the noise detection data nddt of the first DMA operation may be stored as a second value. For example, the first value may be 1 and the second value may be 0. However, implementations are not limited thereto, and the first value may be 0 and the second value may be 1.

The latch circuit 222 may output the noise detection data nddt of the first DMA operation in response to the get feature command Get CMD. The latch circuit 222 may output the noise detection data nddt of the first DMA operation stored in the first bit Din<0> in response to the get feature command Get CMD. The latch circuit 222 may output the noise detection data nddt through an output pin DATA OUT. For example, the latch circuit 222 may output the noise detection data nddt of the first DMA operation by using a universal internal bus (UIB).

Figure 10B:
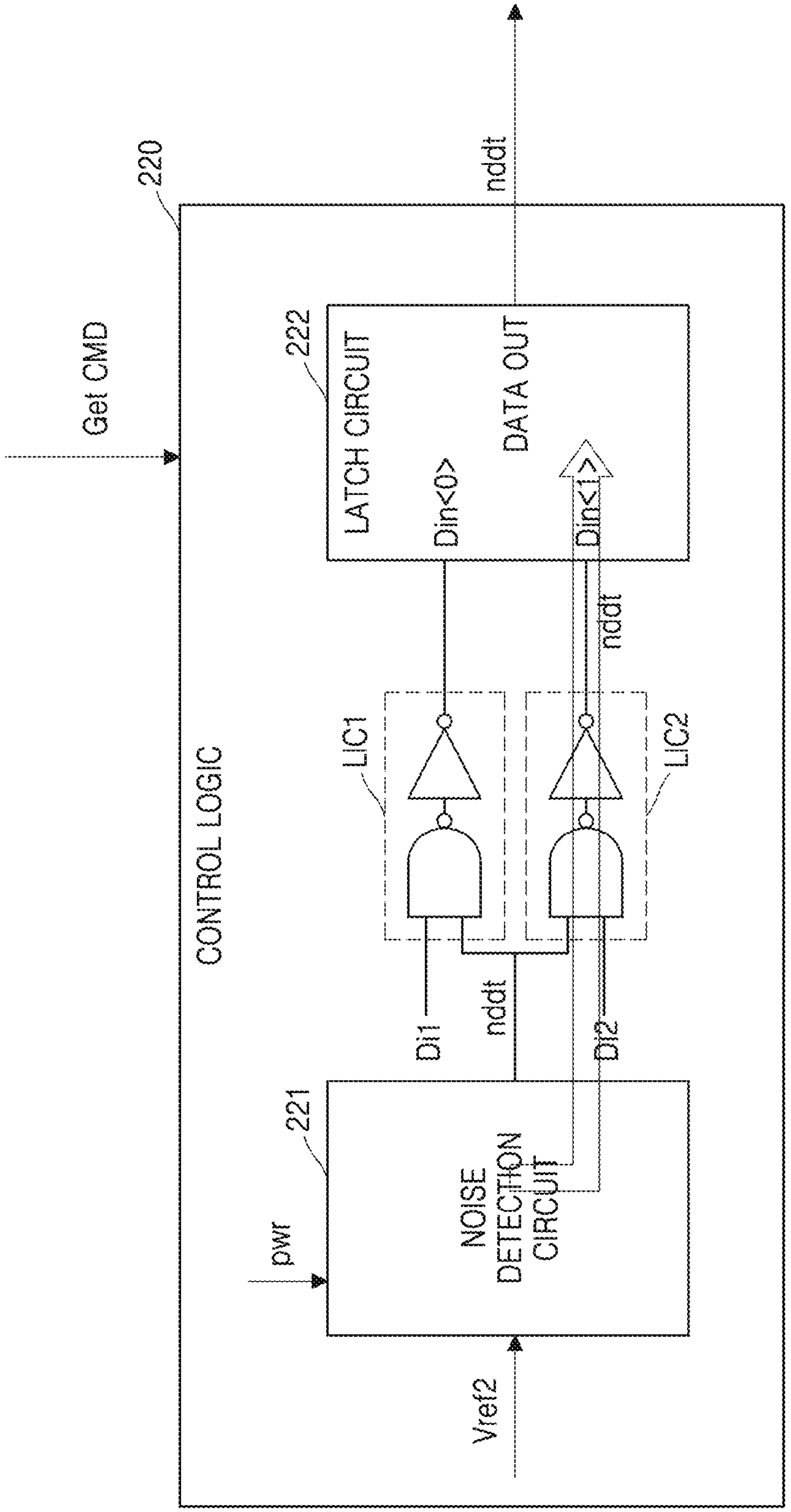
FIG. 10B is a diagram for explaining noise detection data of a second DMA operation according to some implementations.

FIG. 10B is a diagram for explaining noise detection data of a second DMA operation according to some implementations. Specifically, FIG. 10B illustrates an operation of the control logic 220 in the second DMA operation. The redundant descriptions as those given above are omitted.

Referring to FIG. 10B, the noise detection circuit 221 may obtain the second reference value Vref2. The noise detection circuit 221 may generate the noise detection data nddt of the second DMA operation by comparing the second reference value Vref2 with the power value pwr.

The second latch input circuit LIC2 may receive the second DMA information Di2 and the noise detection data nddt of the second DMA operation. The second latch input circuit LIC2 may be enabled in the second DMA operation based on the second DMA information Di2. The second latch input circuit LIC2 may include a NAND gate and an inverter device. The noise detection data nddt of the second DMA operation may be transmitted to the latch circuit 222 through the second latch input circuit LIC2.

The latch circuit 222 may store the noise detection data nddt of the second DMA operation in a second bit Din<1> of the latch circuit 222. When power noise is detected during the second DMA operation, a bit value of the noise detection data nddt of the second DMA operation may be stored as a first value. When power noise is not detected during the second DMA operation, the bit value of the noise detection data nddt of the second DMA operation may be stored as a second value.

The latch circuit 222 may output the noise detection data nddt of the second DMA operation in response to the get feature command Get CMD. The latch circuit 222 may output the noise detection data nddt of the second DMA operation stored in the second bit Din<1> in response to the get feature command Get CMD.

Figure 11:
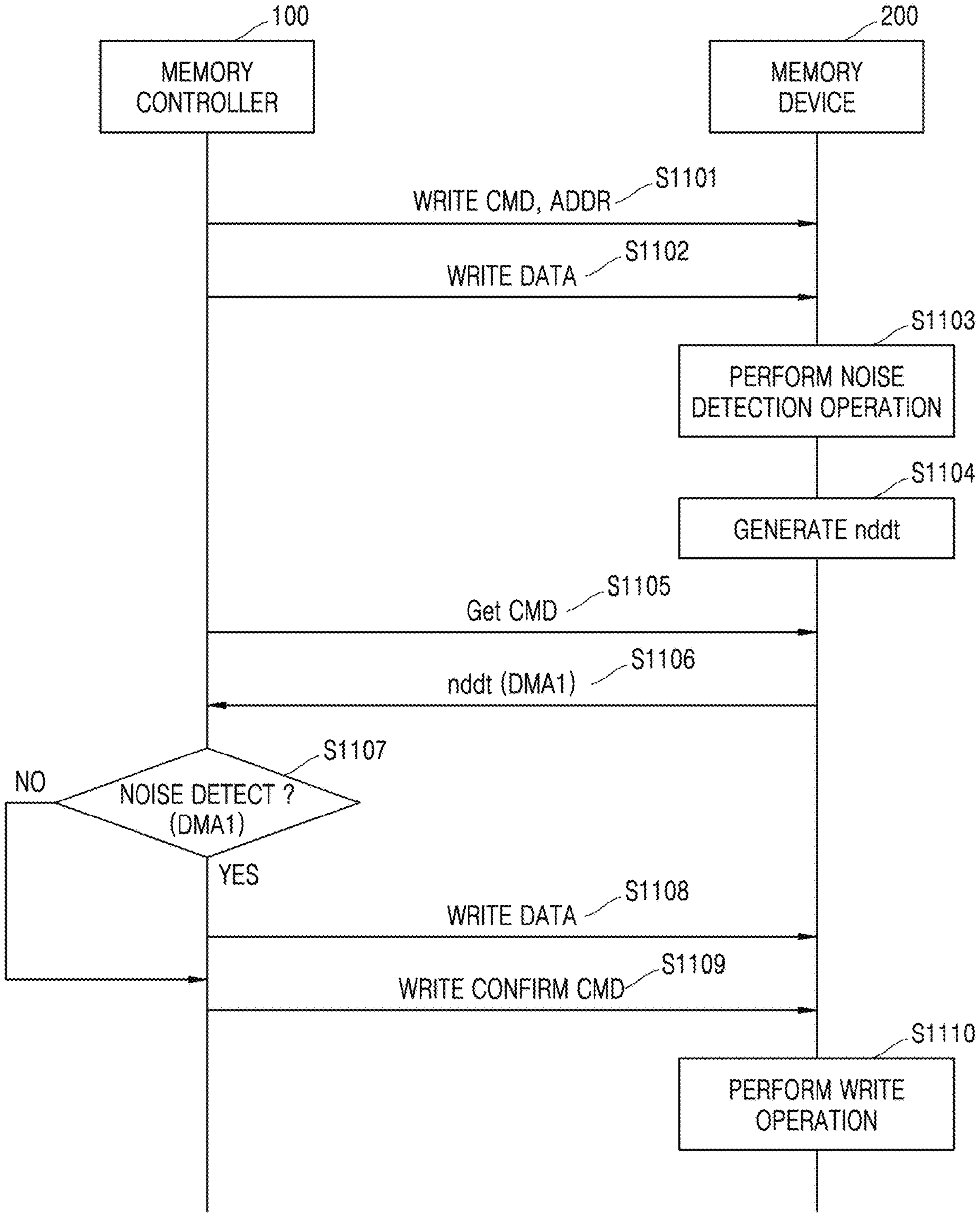
FIG. 11 is a flowchart for explaining the first DMA operation according to some implementations.

FIG. 11 is a flowchart for explaining a first DMA operation according to some implementations. The redundant descriptions as those given with reference to FIG. 7 are omitted.

Referring to FIGS. 1 and 11, in operation S1101, the memory controller 100 may transmit a write command Write CMD and the address ADDR to the memory device 200. The memory controller 100 may provide the write command CMD and the address ADDR to the memory device 200 through the first bus B1. The memory controller 100 may transmit the write command CMD and the address ADDR to the memory device 200 as the command-address signal CA.

In operation S1102, the memory controller 100 may transmit write operation data Write DATA to the memory device 200. The memory controller 100 may perform the first DMA operation through the second bus B2. The memory controller 100 may transmit the write operation data Write DATA to the memory device 200 through the second bus B2. The memory device 200 may receive the write operation data Write DATA.

In operation S1103, the memory device 200 may perform a noise detection operation. The memory device 200 may detect noise generated in power provided to the memory device 200 during the first DMA operation. The memory device 200 may detect power noise while the write operation data Write DATA is transmitted to the memory device 200. The memory device 200 may detect power noise in a first DMA operation period. Upon receiving the command-address signal CA of the write operation, the memory device 200 may detect power noise in the first DMA operation period. The memory device 200 may detect power noise in the first DMA operation by comparing a first reference value with a power value of a power.

In operation S1104, the memory device 200 may generate the noise detection data nddt of the first DMA operation. The memory device may perform operation S1103 to generate the noise detection data nddt. For example, the noise detection data nddt may indicate whether power noise is detected during the first DMA operation. Operations S1103 and S1104 are shown to follow operation S1102, but are not necessarily limited thereto. For example, operations S1103 and S1104 may be performed simultaneously with operation S1102, or may be performed after operation S1105.

In operation S1105, the memory controller 100 may transmit the get feature command Get CMD to the memory device 200. In some implementations, the get feature command Get CMD may be transmitted to the memory device 200 during operation S1102. The memory controller 100 may transmit the get feature command Get CMD to the memory device 200 through the first bus B1.

In operation S1106, the memory device 200 may transmit the noise detection data nddt of the first DMA operation to the memory controller 100. The memory device 200 may transmit the noise detection data nddt of the first DMA operation in response to the get feature command Get CMD. The memory device 200 may transmit the noise detection data nddt to the memory controller 100 through the first bus B1.

In operation S1107, the memory controller 100 may determine whether power noise has been detected in the first DMA operation based on the noise detection data nddt of the first DMA operation.

In some implementations, the memory controller 100 may determine whether power noise is detected based on a bit value of the noise detection data nddt of the first DMA operation. For example, the memory controller 100 may determine whether power noise is detected in the first DMA operation based on the bit value of the first bit of the noise detection data nddt. A first bit of the noise detection data nddt may indicate the noise detection data nddt of the first DMA operation. For example, when the bit value of the first bit of the noise detection data nddt is the first value, the memory controller 100 may determine that power noise is detected during the first DMA operation. When the bit value of the first bit of the noise detection data nddt is a second value, the memory controller 100 may determine that power noise is not detected during the first DMA operation.

When power noise is detected during the first DMA operation, the memory controller 100 may perform the first DMA operation again. In operation S1108, the memory controller 100 may transmit the write operation data Write DATA back to the memory device 200 through the second bus B2. When power noise is not detected during the first DMA operation, the memory controller 100 may skip operation S1108.

In operation S1109, the memory controller 100 may transmit a write confirmation command Write Confirm CMD to the memory device 200. The memory controller 100 may transmit the write operation data Write DATA back to the memory device 200 and then transmit the write confirmation command Write Confirm CMD. In operation S1110, the memory device 200 may perform a write operation. The memory device 200 may write the write operation data Write DATA to the memory device 200.

Figure 12A:
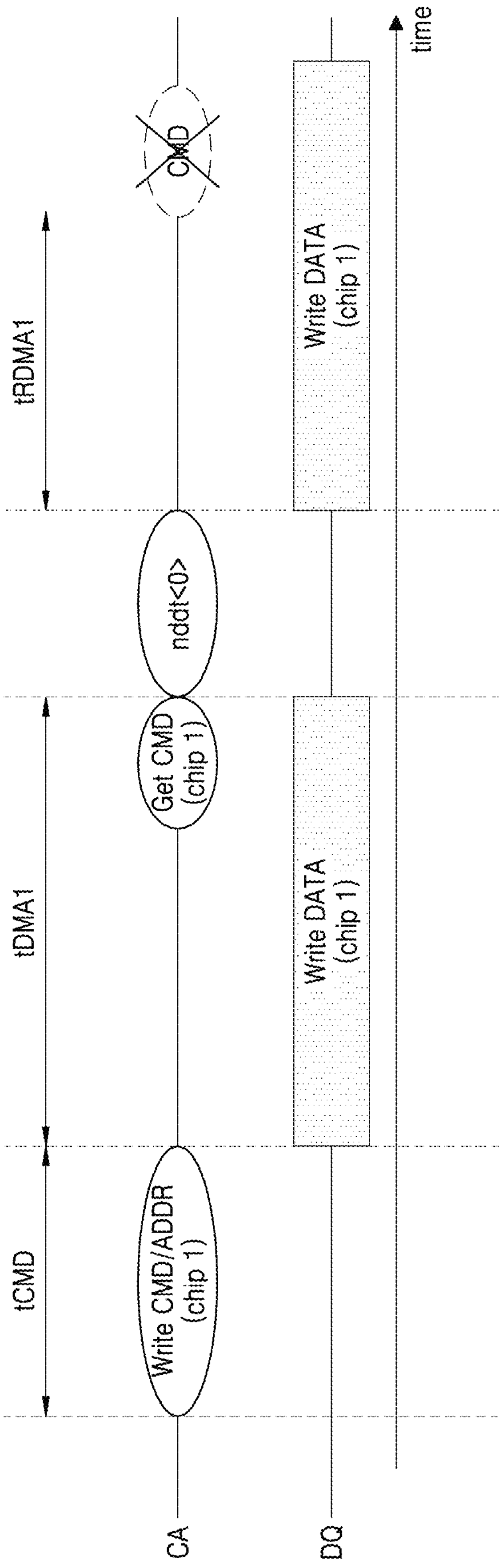
FIG. 12A is a timing diagram for explaining a case where power noise is detected in the first DMA operation according to some implementations.

FIG. 12A is a timing diagram for explaining a case where power noise is detected in a first DMA operation according to some implementations. In FIG. 12A, the case in which the power noise is detected during the first DMA operation will be described. The redundant descriptions as those given above are omitted.

Referring to FIGS. 4 and 12A, the memory controller 100 may transmit the command-address signal CA of a write operation through the first bus B1, and the memory controller 100 may transmit the write command CMD and the address ADDR to the memory device 200 during the command period tCMD. For example, the memory controller 100 may transmit the write command Write CMD and the address ADDR with respect to a first chip to the memory device 200 during the command period tCMD of the first chip. The command period tCMD may correspond to operation S1101 of FIG. 11.

The memory controller 100 may transmit the write operation data Write DATA during a first DMA operation period tDMA1. The memory controller 100 may transmit the write operation data Write DATA as the data signal DQ. The first DMA operation period tDMA1 may correspond to operation S1102 of FIG. 11.

The memory device 200 may detect the power noise during the first DMA operation period tDMA1 and generate the noise detection data nddt of the first DMA operation. The memory controller 100 may transmit the get feature command Get CMD to the memory device 200 during the first DMA operation period tDMA1. This may correspond to operation S1105 of FIG. 11. For example, the memory controller 100 may transmit the get feature command Get CMD with respect to the first chip through the second bus B2 during the first DMA operation period tDMA1 with respect to the first chip.

The memory device 200 may output the noise detection data nddt of the first DMA operation in response to the get feature command Get CMD. The memory controller 100 may receive the noise detection data nddt of the first DMA operation through the first bus B1.

The memory controller 100 may determine whether noise is detected based on the noise detection data nddt of the first DMA operation. The memory controller 100 may determine whether noise is detected based on a bit of the noise detection data nddt and a bit value of the corresponding bit. For example, the memory controller 100 may determine whether power noise is detected in the first DMA operation based on a bit value of a first bit nddt<0> of the noise detection data nddt. When the bit value of the first bit nddt<0> of the noise detection data nddt is a first value, the memory controller 100 may determine that power noise is detected during the first DMA operation. For example, the memory controller 100 may determine that power noise is detected during the first DMA operation because the bit value of the first bit nddt<0> of the noise detection data nddt is 1. However, implementations are not necessarily limited thereto.

Because the bit value of the noise detection data nddt of the first DMA operation is the first value, the memory controller 100 may perform the first DMA operation again. The memory controller 100 may transmit the write operation data Write DATA back to the memory device 200 during a first re-DMA operation period tRDMA1.

In some implementations, the memory controller 100 may stop applying the command CMD during a period in which the DMA operation is performed again. The memory controller 100 may not transmit the command CMD to the memory device 200 through the first bus B1 during the first re-DMA operation period tRDMA1.

Figure 12B:
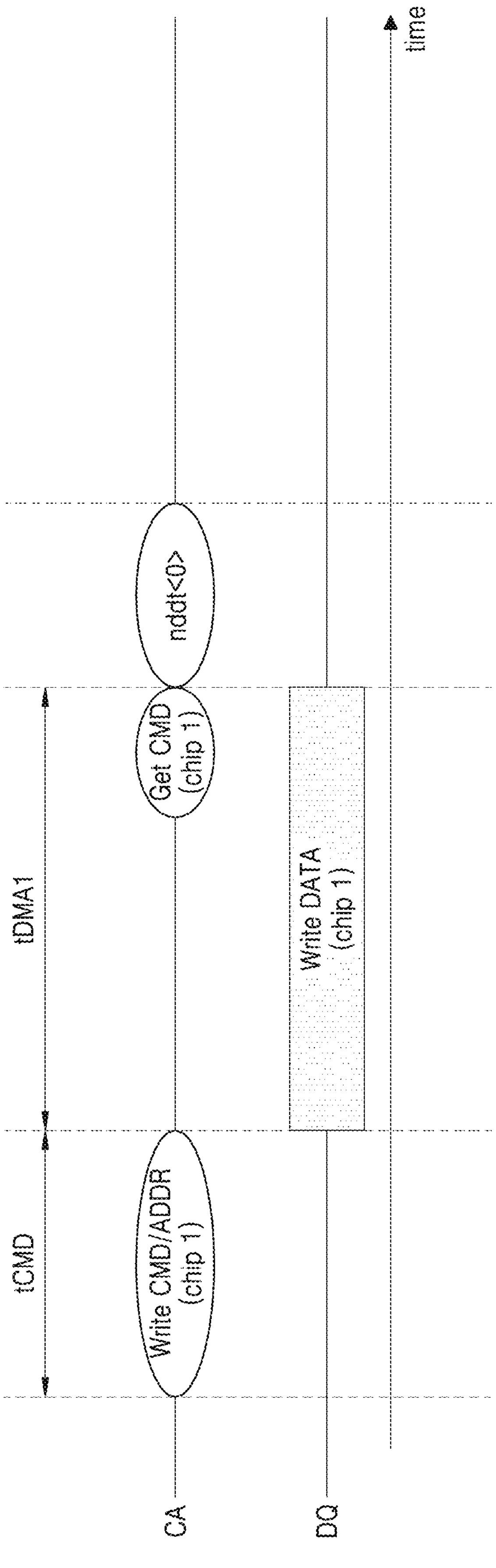
FIG. 12B is a timing diagram for explaining a case where power noise is not detected in the first DMA operation according to some implementations.

FIG. 12B is a timing diagram for explaining a case where power noise is not detected in a first DMA operation according to some implementations. In FIG. 12B, the case where the power noise is not detected during the first DMA operation will be described. The redundant descriptions as those given above are omitted.

The memory controller 100 may determine whether noise is detected based on the noise detection data nddt of the first DMA operation. For example, the memory controller 100 may determine whether the power noise is detected in the first DMA operation based on a bit value of the first bit nddt<0> of the noise detection data nddt. When the bit value of the first bit nddt<0> of the noise detection data nddt is a second value, the memory controller 100 may determine that the power noise is not detected during the first DMA operation. For example, the memory controller 100 may determine that the power noise is not detected during the first DMA operation because the bit value of the first bit nddt<0> of the noise detection data nddt is 0. However, implementations are not necessarily limited thereto.

Because the bit value of the noise detection data nddt of the first DMA operation is the second value, the memory controller 100 may not perform the first DMA operation again.

Figure 13:
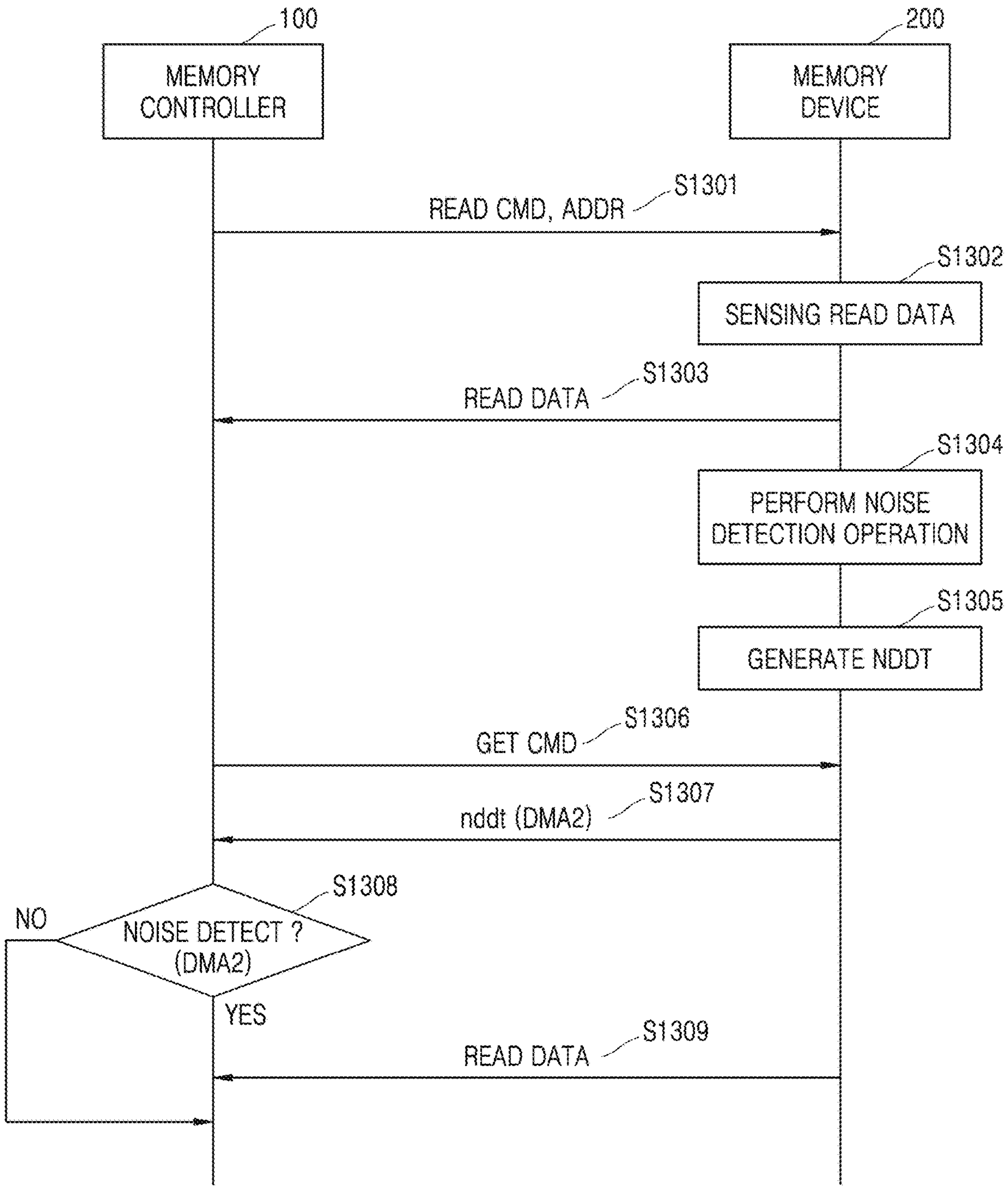
FIG. 13 is a flowchart for describing the second DMA operation according to some implementations.

FIG. 13 is a flowchart for describing the second DMA operation according to some implementations. The redundant descriptions as those given with reference to FIG. 7 are omitted.

Referring to FIGS. 1 and 13, in operation S1301, the memory controller 100 may transmit a read command Read CMD and the address ADDR to the memory device 200. The memory controller 100 may provide the read command Read CMD and the address ADDR to the memory device 200 through the first bus B1.

In operation S1302, the memory device 200 may sense the read operation data DATA. The memory device 200 may perform a read operation based on the read command Read CMD and the address ADDR. For example, the memory device 200 may sense the read operation data Read DATA from the memory cell array 210. The sensed read operation data Read DATA may be temporarily stored in a page buffer circuit (e.g., the page buffer circuit 250 of FIG. 3).

In operation S1303, the memory device 200 may transmit the read operation data Read DATA to the memory controller 100. The memory device 200 may transmit the read operation data Read DATA to the memory controller 100 through the second bus B2. The memory controller 100 may perform a second DMA operation of receiving the read operation data Read DATA from the memory device 200.

In operation S1304, the memory device 200 may perform a noise detection operation. The memory device 200 may detect whether noise occurred in power provided to the memory device 200 during the second DMA operation. The memory device 200 may detect the power noise while transmitting the read operation data Read DATA to the memory device 200. The memory device 200 may detect the power noise in the second DMA operation by comparing a second reference value with a power value of power.

In operation S1305, the memory device 200 may generate the noise detection data nddt of the second DMA operation. For example, the noise detection data nddt may indicate whether the power noise is detected during the second DMA operation. Operations S1304 and S1305 are shown to follow operation S1303, but are not necessarily limited thereto. For example, operations S1304 and S1305 may be performed simultaneously with operation S1303, or may be performed after operation S1306.

In operation S1306, the memory controller 100 may transmit the get feature command Get CMD to the memory device 200. In some implementations, the memory controller 100 may transmit the get feature command Get CMD within the second DMA operation period.

In operation S1307, the memory device 200 may transmit the noise detection data nddt of the second DMA operation in response to the get feature command Get CMD.

In operation S1308, the memory controller 100 may determine whether the power noise has been detected in the second DMA operation based on the noise detection data nddt of the second DMA operation.

In some implementations, the memory controller 100 may determine whether the power noise is detected based on a bit value of the noise detection data nddt of the second DMA operation. For example, the memory controller 100 may determine whether the power noise is detected in the second DMA operation based on a bit value of a second bit of the noise detection data nddt. The second bit of the noise detection data nddt may indicate the noise detection data nddt of the second DMA operation. For example, when the bit value of the second bit of the noise detection data nddt is a first value, the memory controller 100 may determine that the power noise is detected during the second DMA operation. When the bit value of the second bit of the noise detection data nddt is a second value, the memory controller 100 may determine that the power noise is not detected during the second DMA operation.

When power noise is detected during the second DMA operation, the memory controller 100 may perform the second DMA operation again. When power noise is detected during the second DMA operation, the memory controller 100 may perform operation S1309. When power noise is not detected during the second DMA operation, the memory controller 100 may skip operation S1309.

In operation S1309, the memory controller 100 may receive the read operation data Read DATA again. The memory device 200 may transmit the read operation data Read DATA to the memory device 200.

Figure 14A:
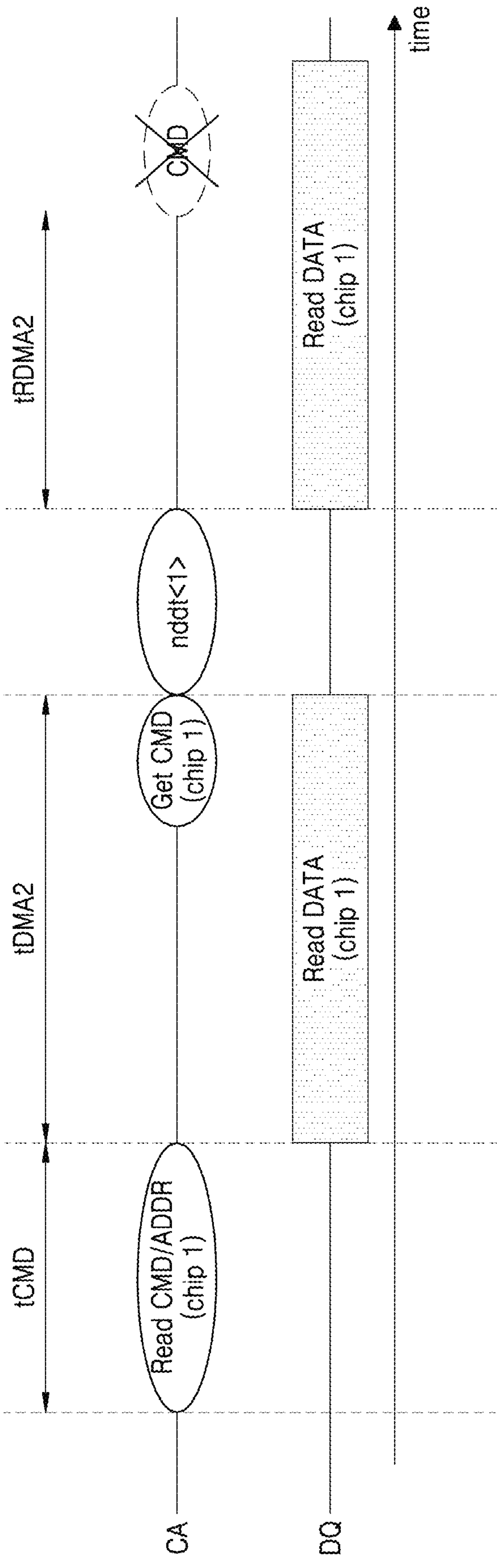
FIG. 14A is a timing diagram for explaining a case where power noise is detected in the second DMA operation according to some implementations.

FIG. 14A is a timing diagram for explaining a case where power noise is detected in a second DMA operation according to some implementations. In FIG. 14A, the case where the power noise is detected during the second DMA operation will be described. The redundant descriptions as those given above are omitted.

Referring to FIGS. 4 and 14A, the memory controller 100 may transmit the read command CMD and the address ADDR to the memory device 200 during the command period tCMD.

The memory controller 100 may perform the second DMA operation. The memory controller 100 may receive the read operation data Read DATA during the second DMA operation period tDMA2.

The memory device 200 may detect the power noise during the second DMA operation and generate the noise detection data nddt of the second DMA operation. The memory controller 100 may transmit the get feature command Get CMD to the memory device 200 during a second DMA operation period tDMA2. For example, the memory controller 100 may transmit the get feature command Get CMD with respect to a first chip through the second bus B2 during the second DMA operation period tDMA2 with respect to the first chip.

The memory controller 100 may determine whether noise is detected based on the noise detection data nddt of the second DMA operation. For example, when a bit value of a second bit nddt<1> of the noise detection data nddt is a first value, the memory controller 100 may determine that the power noise is detected during the second DMA operation. For example, the memory controller 100 may determine that the power noise is detected during the second DMA operation because the bit value of the second bit nddt<1> of the noise detection data nddt is 1. However, implementations are not necessarily limited thereto.

Because the bit value of the noise detection data nddt of the second DMA operation is the first value, the memory controller 100 may perform the second DMA operation again. The memory device 200 may transmit the read operation data Read DATA back to the memory controller 100 during a second re-DMA operation period tRDMA2. The memory controller 100 may not transmit the command CMD to the memory device 200 through the first bus B1 during the second re-DMA operation period tRDMA2.

Figure 14B:
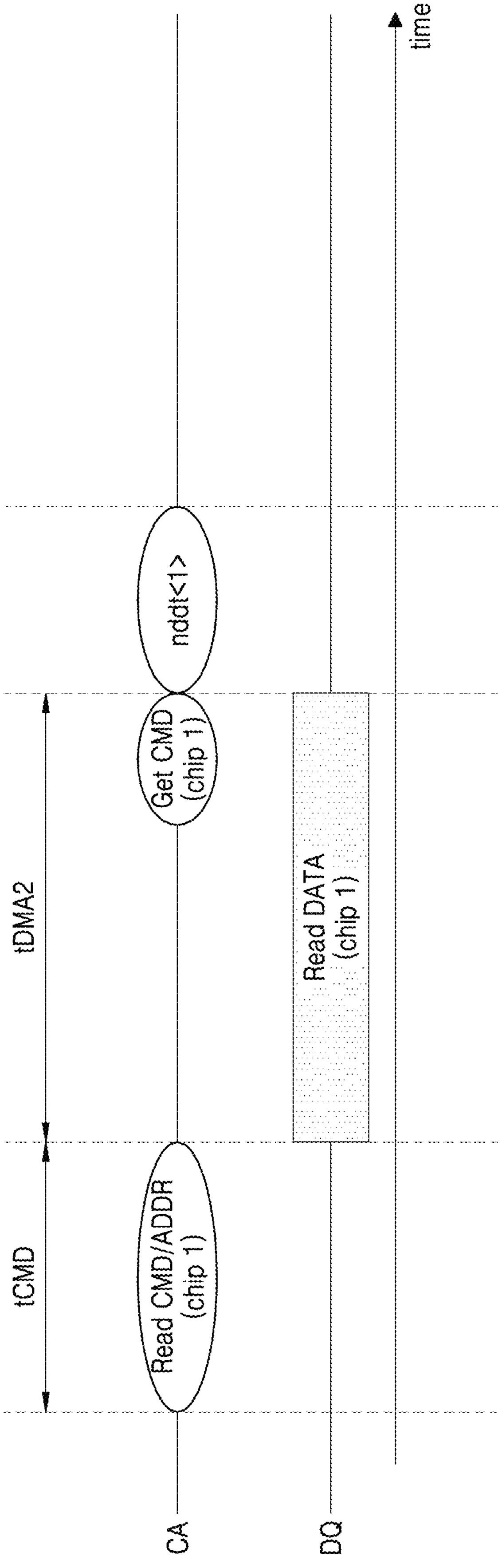
FIG. 14B is a timing diagram for explaining a case where power noise is not detected in the second DMA operation according to some implementations.

FIG. 14B is a timing diagram for explaining a case where power noise is not detected in a second DMA operation according to some implementations. In FIG. 14B, the case where the power noise is not detected during the second DMA operation will be described. The redundant descriptions as those given above are omitted.

The memory controller 100 may determine whether noise is detected based on the noise detection data nddt of the second DMA operation. For example, when a bit value of the second bit nddt<1> of the noise detection data nddt is a second value, the memory controller 100 may determine that the power noise is not detected during the second DMA operation. For example, the memory controller 100 may determine that the power noise is not detected during the second DMA operation because the bit value of the second bit nddt<1> of the noise detection data nddt is 0. However, implementations are not necessarily limited thereto.

Because the bit value of the noise detection data nddt of the second DMA operation is the second value, the memory controller 100 may not perform the second DMA operation again.

Figure 15:
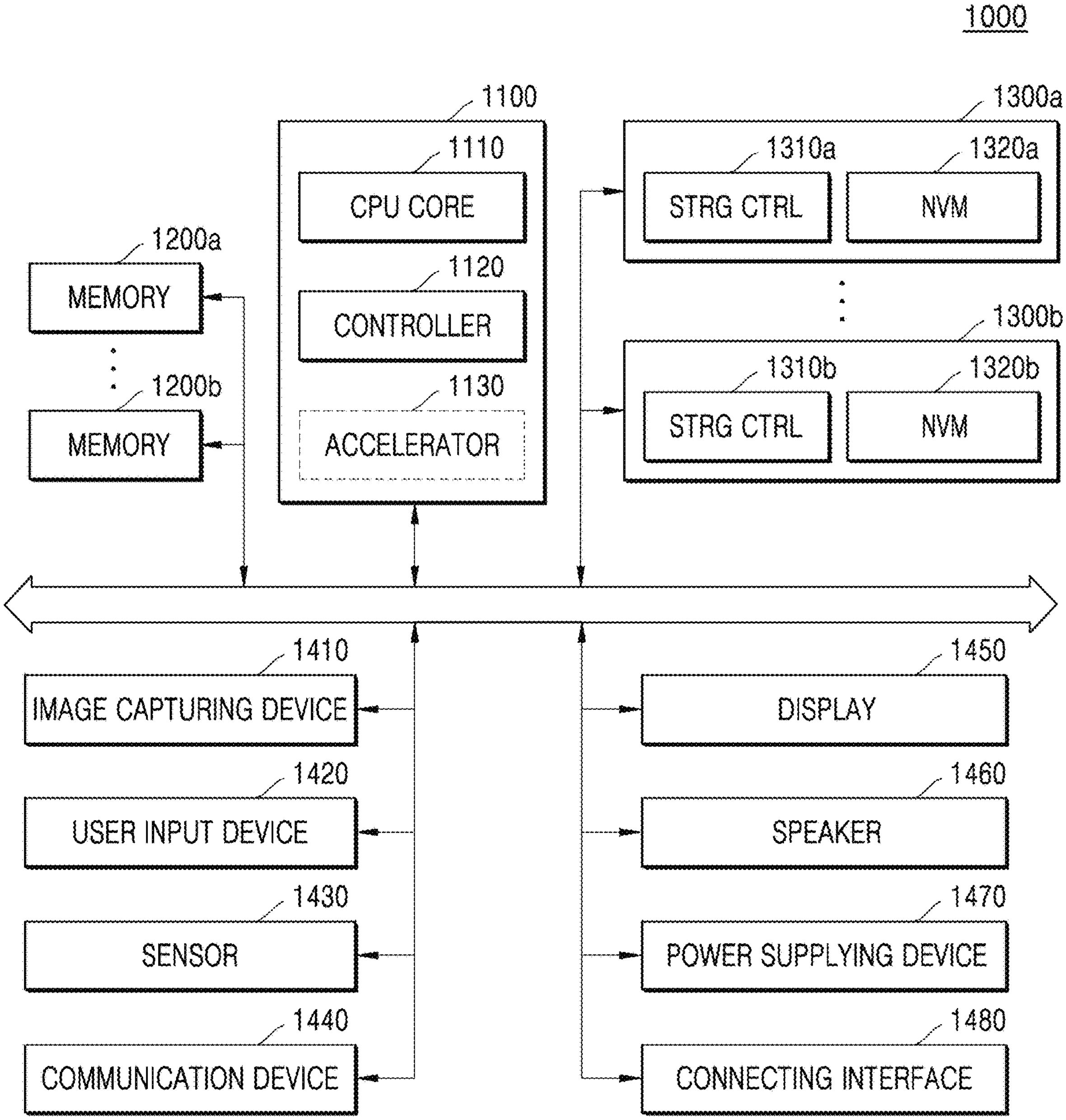
FIG. 15 illustrates a system to which a memory device is applied according to some implementations.

FIG. 15 illustrates a system 1000 to which a memory device is applied, according to some implementations. Each of NVM devices 1320*a* and 1320*b* of FIG. 15 may be the memory device described previously in this disclosure (e.g., the memory device 200 of FIG. 1). Each of storage devices 1300*a* and 1300*b* of FIG. 15 may be a memory system described previously in this disclosure (e.g., the memory system 10 of FIG. 1). The system 1000 of FIG. 15 may basically be a mobile system such as a mobile phone, a smartphone, a tablet personal computer (PC), a wearable device, a healthcare device, or an Internet of Things (IoT) device. However, the system 1000 of FIG. 15 is not necessarily limited to the mobile system, but may be a PC, a laptop computer, a server, a media player, or an automotive device such as a navigation device.

Referring to FIG. 15, the system 1000 may include a main processor 1100, memories 1200*a* and 1200*b*, and the storage devices 1300*a* and 1300*b*, and may additionally include at least one of an image capturing device 1410, a user input device 1420, a sensor 1430, a communication device 1440, a display 1450, a speaker 1460, a power supplying device 1470, and a connecting interface 1480.

The main processor 1100 may control the overall operation of the system 1000, more specifically, operations of other components constituting the system 1000. The main processor 1100 may be implemented as a general-purpose processor, a dedicated processor, an application processor, etc.

The main processor 1100 may include one or more CPU cores 1110, and may further include a controller 1120 for controlling the memories 1200*a* and 1200*b* and/or the storage devices 1300*a* and 1300*b*. According to some implementations, the main processor 1100 may further include an accelerator 1130, which is a dedicated circuit for a high-speed data operation such as an artificial intelligence (AI) data operation. The accelerator 1130 may include a graphics processing unit (GPU), a natural processing unit (NPU), and/or a data processing unit (DPU), and may be implemented as a separate chip physically independent of other components of the main processor 1100.

The memories 1200*a* and 1200*b* may be used as a main memory device of the system 1000, and may include a volatile memory such as an SRAM and/or a DRAM, but may also include a nonvolatile memory such as a flash memory, a PRAM and/or an RRAM. The memories 1200*a* and 1200*b* may be implemented in the same package as the main processor 1100.

The storage devices 1300*a* and 1300*b* may function as nonvolatile storage devices that store data regardless of whether power is supplied or not, and may have relatively large storage capacities compared to the memories 1200*a* and 1200*b*. The storage devices 1300*a* and 1300*b* may include memory controllers 1310*a* and 1310*b* and the NVM devices 1320*a* and 1320*b* that store data by the control of the memory controllers 1310*a* and 1310*b*. The NVM devices 1320*a* and 1320*b* may include flash memories of a 2-dimensional (2D) structure or a 3D V-NAND (Vertical NAND) structure, but may also include other types of nonvolatile memories such as a PRAM and/or an RRAM. The memory device described in FIGS. 1 to 14B (e.g., the memory device 200 in FIG. 1) may be applied to the NVM devices 1320*a* and 1320*b* of FIG. 15.

The storage devices 1300*a* and 1300*b* may be physically separated from the main processor 1100 and included in the system 1000, or may be implemented in the same package as the main processor 1100. In addition, the storage devices 1300*a* and 1300*b* may be each in the form such as a solid state device (SSD) or a memory card, and detachably coupled to other components of the system 1000 through an interface such as the connecting interface 1480 to be described below. Such storage devices 1300*a* and 1300*b* may be devices to which a standard protocol such as a UFS protocol, an eMMC protocol, or an NVMe protocol is applied, but are not necessarily limited thereto.

The image capturing device 1410 may capture a still image or a moving image, and may be a camera, a camcorder, a webcam, etc. The user input device 1420 may receive various types of data input from a user of the system 1000, and may be a touch pad, a keypad, a keyboard, a mouse, and/or a microphone. The sensor 1430 may detect various types of physical quantities that may be obtained from the outside of the system 1000 and convert the detected physical quantities into electrical signals. The sensor 1430 may be a temperature sensor, a pressure sensor, an illumination sensor, a position sensor, an acceleration sensor, a biosensor, and/or a gyroscope sensor.

The communication device 1440 may transmit and receive signals between other devices outside the system 1000 according to various communication protocols. Such a communication device 1440 may be implemented by including an antenna, a transceiver, and/or a modem (MODEM). The display 1450 and the speaker 1460 may function as output devices that output visual information and auditory information to the user of the system 1000, respectively. The power supplying device 1470 may appropriately convert power supplied from a battery (not shown) embedded in the system 1000 and/or an external power source and supply the converted power to each of the components of the system 1000.

The connecting interface 1480 may provide a connection between the system 1000 and an external device connected to the system 1000 to transmit and receive data to and from the system 1000. The connecting interface 1480 may be implemented in any of various interface methods such as ATA, SATA, e-SATA, SCSI, SAS, PCI, PCIe, NVMe, IEEE 1394, USB, SD card, MMC, eMMC, UFS, eUFS, or CF card interface.

While this specification contains many specific implementation details, these should not be construed as limitations on the scope of any invention or on the scope of what may be claimed, but rather as descriptions of features that may be specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations, one or more features from a combination can in some cases be excised from the combination, and the combination may be directed to a subcombination or variation of a subcombination.

While the memory device and memory controller have been particularly shown and described with reference to implementations thereof, it will be understood that various changes in form and details may be made therein without departing from the spirit and scope of the following claims.

What is claimed is:

1. A memory device comprising:

a memory cell array comprising a plurality of memory cells; and a control logic configured to control a memory operation with respect to the memory cell array, based on a command and an address provided from a memory controller outside the memory device, wherein the control logic is configured to:

during a direct memory access (DMA) operation, generate noise detection data based on detecting whether noise occurs in power provided to the memory device, wherein the memory device is configured to, during the DMA operation, communicate operation data corresponding to the command and the address, and transfer the noise detection data to the memory controller.

2. The memory device of claim 1, wherein the memory device is configured to transfer the noise detection data in response to a get feature command.

3. The memory device of claim 2, wherein the control logic is configured to receive the get feature command within a DMA operation period.

4. The memory device of claim 1, wherein the memory device is configured to receive the command and the address from the memory controller through a first bus, and transmit and receive the operation data to and from the memory controller through a second bus.

5. The memory device of claim 4, wherein the control logic is configured to transfer the noise detection data to the memory controller through the first bus.

6. The memory device of claim 1, wherein the control logic is configured to obtain a reference value corresponding to the DMA operation based on DMA information indicating information about the DMA operation, and generate the noise detection data based on comparing a power value of the power with the reference value.

7. The memory device of claim 6, wherein the DMA operation includes a first DMA operation in which the memory device receives the operation data from the memory controller and a second DMA operation in which the memory device transmits the operation data to the memory controller, and the control logic is configured to generate noise detection data of the first DMA operation based on comparing a first reference value corresponding to the first DMA operation with the power value, and generate noise detection data of the second DMA operation based on comparing a second reference value corresponding to the second DMA operation with the power value.

8. The memory device of claim 6, wherein the memory device further includes a one time programmable (OTP) memory device configured to be programmed one time, and the OTP memory device is configured to store the reference value.

9. The memory device of claim 1, further comprising: a latch circuit configured to store the noise detection data, wherein the latch circuit is configured to transfer the noise detection data to the memory controller in response to a get feature command.

10. A memory controller controlling a memory device, the memory controller comprising:

a memory interface configured to:

transfer a command and an address through a first bus to control a memory operation on the memory device, and transmit and receive operation data corresponding to the command and the address to and from the memory device through a second bus; and an operation processor configured to:

receive noise detection data indicating whether noise occurs in power provided to the memory device through the first bus during a direct memory access (DMA) operation, and perform the DMA operation based on the noise being detected in the power during the DMA operation according to the noise detection data.

11. The memory controller of claim 10, wherein the operation processor is configured to transmit a get feature command through the first bus, and receive the noise detection data in response to the get feature command.

12. The memory controller of claim 11, wherein the operation processor is configured to transmit the get feature command within a DMA operation period, and the DMA operation period follows a command period in which the command and the address are transmitted to the memory device.

13. The memory controller of claim 10, wherein the DMA operation includes a first DMA operation in which the memory controller transmits the operation data to the memory device, and the operation processor is configured to perform the first DMA operation through the second bus based on the noise being detected in the power during the first DMA operation.

14. The memory controller of claim 13, wherein the DMA operation includes a second DMA operation in which the memory controller receives sensed operation data from the memory device, and the operation processor is configured to perform the second DMA operation through the second bus based on the noise being detected in the power during the second DMA operation.

15. The memory controller of claim 10, wherein the operation processor is configured to stop applying the command through the first bus during a period in which the DMA operation is performed again.

16. The memory controller of claim 10, wherein the operation processor is configured to:

based on a bit value of the noise detection data being a first value, determine that the noise has been detected in the power during the DMA operation, and based on the bit value of the noise detection data being a second value, determine that the noise has not been detected in the power during the DMA operation.

17. The memory controller of claim 10, wherein the DMA operation includes a first DMA operation in which the memory controller transmits the operation data to the memory device and a second DMA operation in which the memory controller receives sensed operation data from the memory device, the operation processor is configured to determine whether the noise has been detected in the power during the first DMA operation based on a bit value of a first bit of the noise detection data, and determine whether the noise has been detected in the power during the second DMA operation based on a bit value of a second bit of the noise detection data.

18. An operating method of a memory system comprising a memory controller and a memory device, the operating method comprising:

transmitting, by the memory controller, a command and an address through a first bus to control a memory operation on the memory device;

performing, by the memory controller, a direct memory access (DMA) operation in which operation data corresponding to the command and the address is transmitted and received through a second bus;

generating, by the memory device, noise detection data by detecting whether noise occurs in power provided to the memory device during the DMA operation;

transmitting, by the memory device, the noise detection data to the memory controller through the first bus; and determining, by the memory controller, whether the noise is detected based on the noise detection data, and performing the DMA operation based on the noise being detected in the power.

19. The operating method of claim 18, wherein transmitting the noise detection data to the memory controller includes storing the noise detection data in a latch circuit inside the memory device; and transferring the noise detection data to the memory controller in response to a get feature command from the memory controller.

20. The operating method of claim 18, wherein the DMA operation includes a first DMA operation in which the operation data is transmitted to the memory device and a second DMA operation in which sensed operation data is received from the memory device, and performing the DMA operation includes, performing the first DMA operation through the second bus, based on the noise being detected in the power during the first DMA operation; and performing the second DMA operation through the second bus, based on the noise being detected in the power during the second DMA operation.

* * * * *